United States Patent [19]

Hood et al.

[11] Patent Number: 5,416,308
[45] Date of Patent: May 16, 1995

[54] TRANSACTION DOCUMENT READER

[75] Inventors: Ernest J. Hood, Shoreview; Patrick R. Machnik, Maplewood; Bruce L. Petersen, Moundsview; Joseph C. Selden, North Oaks, all of Minn.

[73] Assignee: Video Lottery Technologies, Inc., Bozeman, Mont.

[21] Appl. No.: 751,771

[22] Filed: Aug. 29, 1991

[51] Int. Cl.$^6$ .............................. G06K 7/10
[52] U.S. Cl. ......................... 235/454; 235/456; 382/317
[58] Field of Search .............. 235/456, 454; 382/61

[56] References Cited

U.S. PATENT DOCUMENTS

| | | | |
|---|---|---|---|
| 3,164,806 | 1/1965 | Rabinow . | |
| 3,852,573 | 12/1974 | Dolch | 235/456 |
| 3,864,550 | 2/1975 | Cragon | 235/460 |
| 4,021,777 | 5/1977 | Shepard | 382/61 |
| 4,138,662 | 2/1979 | Shimoyama | 382/61 |
| 4,153,895 | 5/1979 | Weisbrod et al. | 235/456 |
| 4,200,861 | 4/1980 | Hubach et al. | 382/34 |
| 4,230,265 | 10/1980 | Casaly | 235/455 |
| 4,326,258 | 4/1982 | de la Guardia | 364/515 |
| 4,450,579 | 5/1984 | Nakashima et al. | 382/8 |
| 4,457,015 | 6/1984 | Nally et al. | 382/45 |
| 4,489,351 | 12/1984 | d'Alayer de Costemore d'Arc | 358/213 |
| 4,490,850 | 12/1984 | Nally et al. | 382/34 |
| 4,490,853 | 12/1984 | Nally et al. | 382/48 |
| 4,493,108 | 1/1985 | Fryer et al. | 382/61 |
| 4,501,016 | 2/1985 | Persoon et al. | 382/22 |
| 4,504,970 | 3/1985 | Werth et al. | 382/14 |
| 4,541,115 | 9/1985 | Werth | 282/14 |
| 4,550,431 | 10/1985 | Werth et al. | 382/1 |
| 4,551,850 | 11/1985 | Werth et al. | 382/18 |
| 4,578,569 | 3/1986 | Arp et al. | 235/454 |
| 4,581,762 | 4/1986 | Lapidus et al. | 382/22 |
| 4,587,421 | 5/1986 | Robertson | 250/239 |
| 4,603,261 | 7/1986 | Robertson et al. | 250/566 |
| 4,677,428 | 6/1987 | Bartholow | 340/708 |
| 4,724,307 | 2/1988 | Dutton et al. | 235/455 |
| 4,742,555 | 5/1988 | Tonkin | 382/50 |
| 4,826,146 | 8/1991 | Uno et al. | 235/456 |
| 5,004,896 | 4/1991 | Serrell et al. | 235/456 |
| 5,038,393 | 8/1991 | Nanba | 382/61 |

FOREIGN PATENT DOCUMENTS 103788 3/1984 European Pat. Off. ............ 235/456
0307925 3/1989 European Pat. Off. .

OTHER PUBLICATIONS

*Digital Signal Processing*, by Ray Dougherty, "Selected Topics in Image Processing Applications", Chapter 13, pp. 397–434.
Product Literature, *Esselte Security Systems*, (1985).
Article, "Sign Here, Please", G. Martin et al., *BYTE*, (Jul. 1990).

Primary Examiner—John Shepperd
Attorney, Agent, or Firm—Kokjer, Kircher, Bowman & Johnson

[57] ABSTRACT

A transaction document reader reads image data on a transaction document. The image data includes marking areas employed by a user to record marks and includes characters. A sensor senses, one row at a time, rows of image data as the document is transported across the sensor. Each row includes a number of pixel areas. The pixel areas of the rows being aligned in columns. The sensor generates output signals representative of the pixel areas. The output signals are transformed into bit signals representative of each pixel area. The bit signals are stored in image memory which is organized into rows and columns of bit signals corresponding to the rows and columns of the pixel areas of the image data. The marking areas are located in image memory. The marks are identified in the marking areas while additional rows of bit signals are being stored and while other marking areas are being located by probing the bit signals in image memory. A specific area within image memory representative of a single character is also located. A neural network is utilized to recognize the character within specific area.

25 Claims, 14 Drawing Sheets

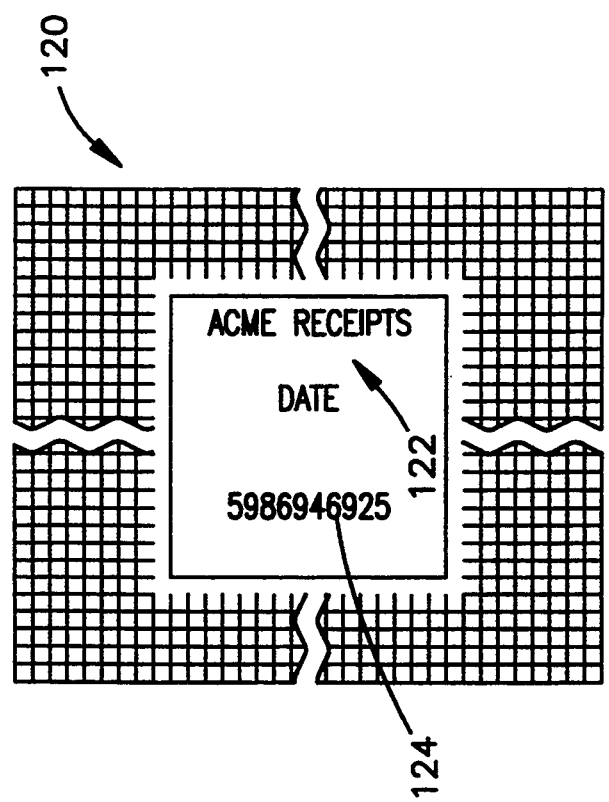
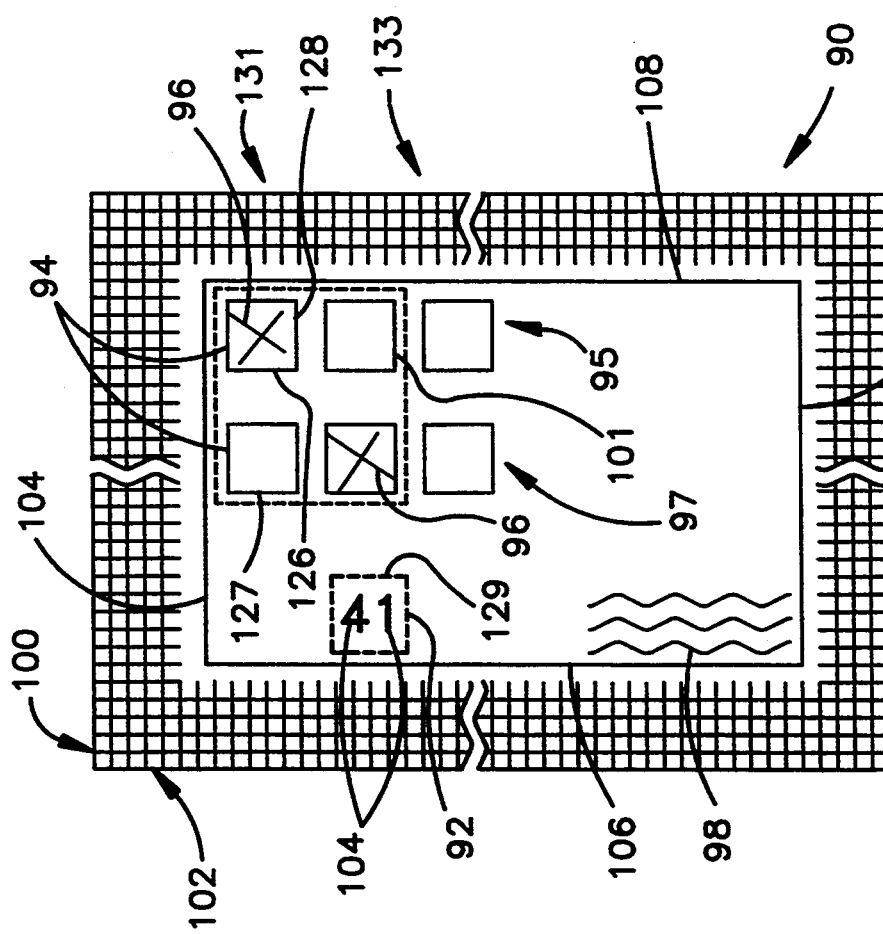

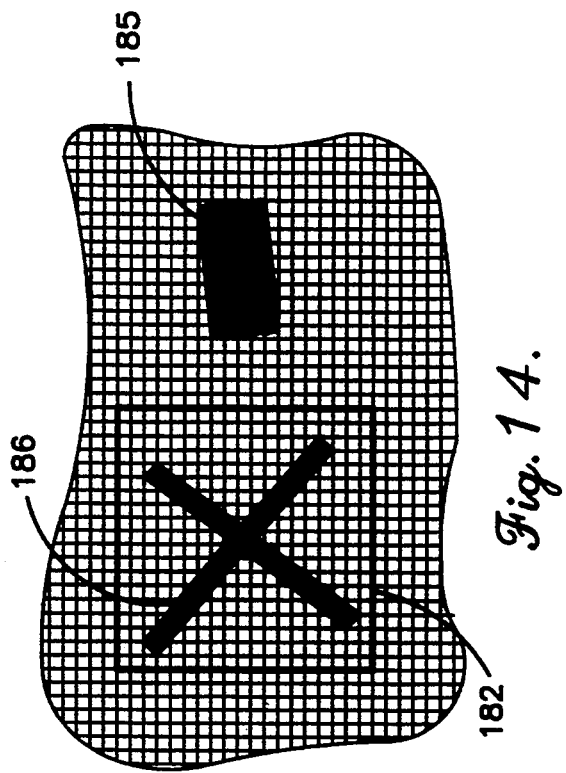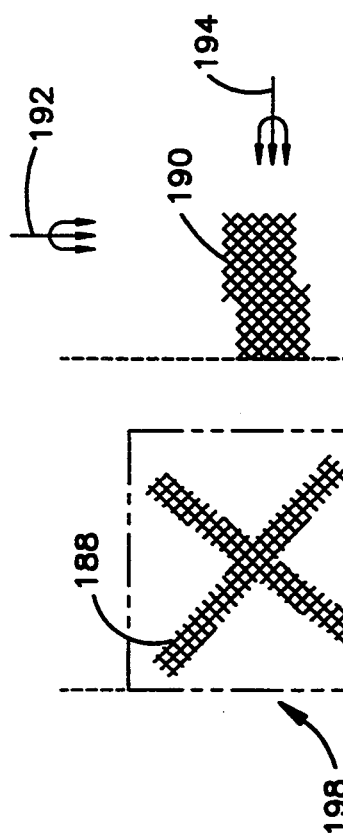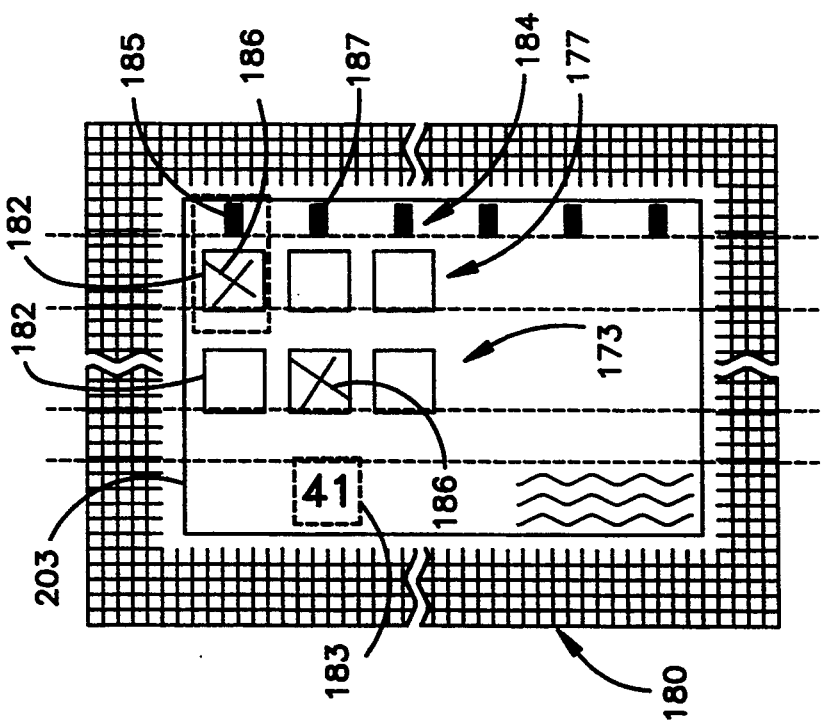

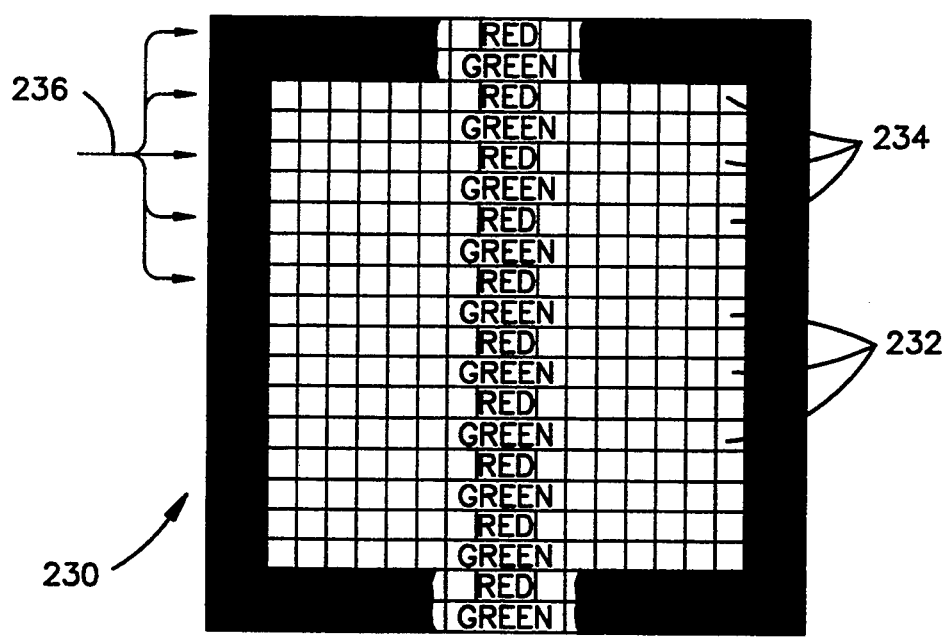
*Fig. 19.*
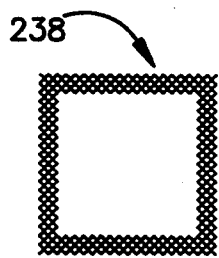
*Fig. 20a.*
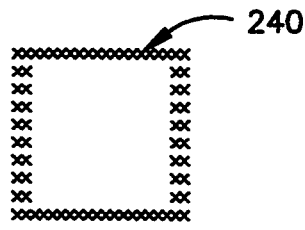
*Fig. 20b.*
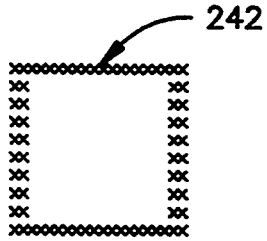
*Fig. 20c.*
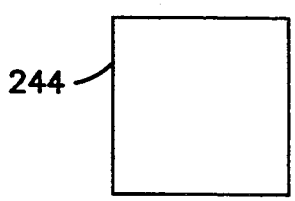
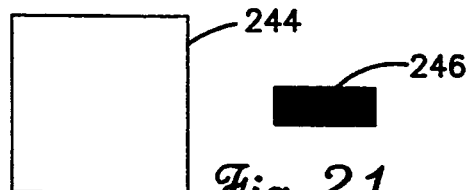
*Fig. 21.*
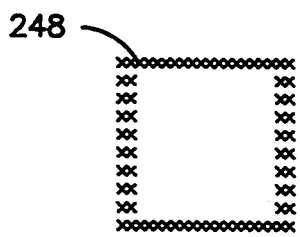
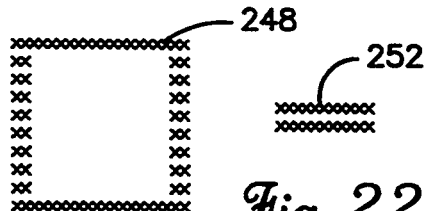
*Fig. 22.*

TRANSACTION DOCUMENT READER

FIELD OF THE INVENTION

This invention relates to the field of optical readers. More particularly, the invention relates to the recognition of handwritten marks and printed characters on transaction documents.

BACKGROUND OF THE INVENTION

Handwritten marks are often recorded in boxes, marking areas, or other fields on a transaction document. These handwritten marks take many different forms. For example, the handwritten mark may be a dot, an "X", a check mark, or the handwritten mark may be a scratching out of a mark previously made by the user. Because many transaction documents, such as lottery documents, restaurant ordering documents, standardized test taking documents, are utilized, it is necessary to be able to interpret such handwritten marks thereon.

Past efforts for interpreting such marks included aligning the marking areas in a number of columns on a transaction document. Individual sensors positionally aligned with the marking areas on the document optically read the marks. Misalignment of the sensors over the particular columns of marking areas produced incorrect readings.

Other optical readers are known in the art for certain uses, such as lottery documents, multiple choice transaction documents, standardized test form documents, etc. U.S. Pat. No. 4,724,307 to Dutton et al. discloses a marked card reader. The reader, as best understood, images an entire marked card and utilizes identification marks thereon to identify the type of card being read and various baseline information with regards thereto, such as the position of image fields. The identification marks also appear to provide a means for compensating for misalignment of the marked card as it is read by an imaging device. The compensation is provided by recalculating addresses of image data in memory such that a corrected memory compensating for the misaligned document is created.

A device like that described in Dutton et al. images the entire document prior to reading any information on the document. The speed of reading the information on the document is therefore, limited. In addition, the recalculation of addresses for the memory containing the image data to correct for misalignment, reduces the speed by which the document can be read.

Dutton et al., in performing the reading of handwritten marks on marked cards, compares the gray level value of pixels representative of the data on the card at potential mark areas with the gray level values for pixels surrounding the potential mark area to determine whether a mark is present or not present. Such gray level pixel value to gray level pixel value comparison consumes precious time in the reading process.

An optical reader capable of both handwritten mark recognition and predetermined character recognition, such as the recognition of numerals 1, 2, 3, etc., is useful in providing a tool whereby later processing of the handwritten marks can be analyzed according to certain recognized characters. For example, a lottery document having a number of boxes with handwritten marks therein may be analyzed after the marks are read according to later processing circuitry initiated by the optical recognition of certain characters on the same document, such as the number "99". The problem of time consumption associated with reading handwritten marks on documents is equally applicable to the recognition of predetermined characters on documents. In order to improve the number of transactions processed in a period of time, the speed and accuracy of optical readers need to be increased.

For the processing of many transaction documents, it is necessary that handwritten marks, or the interpretation thereof, be associated with signatures or other information about the person who placed the handwritten mark. Such association can be accomplished by user-carried information storage cards, for example, those known and used in connection with identification functions and for managing the debiting and crediting of customers financial accounts.

European patent application 0 370 925 discloses a programmable game entry card for use with a wagering system. The player card is provided with connection to a wagering terminal and the information stored in memory on the card can be accessed by the terminal. The card includes the user's status information, wagering amounts information, and other applicable information. Such information is updated when a card transaction is completed. The card allows the player to forego some steps in the wagering process. User-carried information storage cards as described in EP A 0 370 925 would need to be utilized on a regular basis to make them cost efficient. A simpler and less expensive card system accomplishing some of the tedious tasks of a lottery process or transaction process would be beneficial.

Transaction documents are normally printed in few colors in order to render the printing invisible to optical readers while allowing handwritten marks readable. If transaction documents were printed in more colors, enhanced use of the document may be likely, due to aesthetic appeal. Furthermore, various features on documents could be separable by means of making different features appear in different colors and reading those features. For example, marking areas on a document may appear in red, characters for identifying the documents may appear in green, etc. An optical card reader which could discern features printed in various colors would allow such documents to be printed in the various colors, enhancing flexibility of document design.

Prior systems attempting to read colored image data on a transaction document, spacially printed portions of the document in one color and other portions in another color. A light source associated with an optical scanner would utilize filters of various colors to achieve recognition of the various color data. For example, a green filter would be used to provide reflection of green light from portions of the document to an optical sensor and a red filter to reflect red light from another portion of the document to read the image data printed thereon. The problem with filtering the light is that isolation of the green and red filtered light at the boundary between the red and green image data is difficult and results in inflexible designs of the document. A new technique for rendering colored image data "visible" to an image processing system would be beneficial.

Increasing the speed of optically reading handwritten marks and characters is an important characteristic of a successful optical reading system. A system which dynamically reads both handwritten marks and characters eliminates the need for duplicate apparatuses. An optical reader having both mark recognition and character recognition could be used to facilitate document transactions such that users could eliminate tedious steps in a transaction process. Printing various features in different colors on a transaction document and being able to accurately read these features would facilitate perception and use by a user and allow flexible document production. A need exists for a transaction document reader which provides one or more of these characteristics.

SUMMARY OF THE INVENTION

The apparatus of the present invention provides a means for reading image data on a transaction document. The image data includes marking areas employed by a user to record marks and includes a predetermined set of characters. Bit signals representative of rows and columns of dark or light pixel areas of the image data are generated. The bit signals are single bit signals, however, multi-bit signals can also be utilized. An image memory stores the bit signals. The image memory is organized into rows and columns of bit signals corresponding to the plurality of rows and columns of pixel areas of the image data.

The marks recorded in the marking areas are read by locating a portion of the image memory representative of the marking areas of the transaction document as a function of particular reference characteristics of the document and the marks are identified in the marking areas by probing rows of bit signals of the image memory representative of rows of pixel areas within the marking areas.

Characters are optically read by locating a specific area within a character area of the image memory which is representative of at least a single character. A neural network for recognizing the predetermined set of characters is then applied to the specific area.

The apparatus of the present invention also dynamically reads the marks and predetermined characters. A sensor senses rows of image data as the document is transported across the sensor. Each row of image data includes a plurality of pixel areas. The pixel areas are aligned in a plurality of columns. The sensor generates output signals representative of the pixel areas. Transform circuitry receives the output signals and generates bit signals representative of each pixel area. An image memory stores the bit signals in rows and columns corresponding to the plurality of rows and columns of pixel areas of the image data.

The marks recorded in the marking areas are read by locating a portion of the image memory representative of the marking areas of the transaction document. The portions of the image memory are located after rows of bit signals representative of the marking areas are stored in memory and while additional rows of bit signals representative of the other image data are being sensed, transformed, and stored in the image memory. The marks are identified while the additional rows of bit signals are being stored and while the marking areas are being located by probing the bit signals within the image memory.

Characters are optically read by locating a specific area within a character area of the image memory which is representative of a single character after the bit signals representative of the single character are stored in the image memory and while additional bit signals representative of additional image memory data are being sensed, transformed and stored in the image memory. After normalization, a neural network for recognizing the predetermined set of characters is then applied to the specific area.

The apparatus of the present invention also determines a type of transaction document having image data thereon by generating bit signals representative of rows and columns of dark or light pixel areas of the image data. The bit signals are stored in an image memory organized into rows and columns corresponding to the pixel areas of the image data of the document. The document is identified as a function of the dimensions of the document after probing at least one row of the image memory to determine the documents dimensions. In one embodiment, the document's width determines the type of transaction document.

The invention further includes apparatus for compensating for distortion caused by a linear array sensor and optics. The linear array sensor senses a plurality of rows of image data of a document transported across the sensor. Each row of image data includes a plurality of dark or light pixel areas. The pixel areas are aligned in a plurality of columns. Bit signals representative of the dark or light pixel areas are generated and stored in an image memory organized into rows and columns of bit signals corresponding to the rows and columns of pixel areas of the image data on the document. The compensation for distortion caused by the linear array sensor and optics is accomplished by calibrating the document reader using a master document. The master document, having lines corresponding to the transaction document, is transported across the sensor. By comparing the predetermined position of the master document lines measured with respect to document reference characteristics prior to transporting the master document across the sensor, to the lines as represented by the bit signals in the image memory after the master document is sensed and bit signals are generated, the compensation required is determined. As read areas on the transaction document are being located and read by probing the bit signals in the image memory, the probing is adjusted to probe the correct bit signals within the read area in response to the comparison.

The apparatus of the present invention also includes apparatus for compensating for misalignment of the document as it is transported across the sensor. Bit signals are generated as discussed above with regard to compensation for distortion by the sensor. To compensate for misalignment, document reference characteristics are located within the image memory and the angle of the document is determined with respect to a line established by the linear array sensor. When a read area of a transaction document is being located and read by probing the bit signals of the image memory, the probing is adjusted to probe correct pixel areas within the read as a function of the angle of the document.

The apparatus of the present invention is utilized in a method for facilitating transactions involving transaction documents. The user is provided with a user identification card having an identification number thereon and also with a user personalized document. The user identification card number and the user personalized document are digitally imaged by the reader. The digital information representing the user identification number and the associated user personalized document is stored. A document transaction can then be completed by transporting a transaction document and the user identification card with the user identification card number thereon through the reader. The identification number is optically recognized and the transaction document read. The identification number is associated with the transaction document, whereby a personalized document is not required with each transaction.

The present invention also includes apparatus for reading colored image data on a document. A sensor senses a plurality of pixel areas of image data on the document and generates output signals representative of the pixel areas. The output signals are transformed to digital signals representative of the pixel areas and stored in image memory. The image memory includes at least two color image memory fields for different colors. The color image memory fields are probed to read image data of a particular color.

In one embodiment of reading colored image data, the sensor includes a first color light source and a second color light source. The first and second color light source alternately illuminate a plurality of rows of pixel areas of the document. The sensor senses reflected light from the document and generates output signals representative of the pixel areas.

In another embodiment of reading colored image data, the sensor includes a full or broad spectrum light source and a color sensor for sensing reflected light of different colors.

BRIEF DESCRIPTION OF THE DRAWINGS

Thusly summarized, the present invention may be better understood, and the advantages made apparent to those skilled in the art, by reference to the accompanying drawing wherein like reference numbers refer to like elements in the several figures and in which:

FIG. 5 is a representative diagram of a transaction document to be read by said transaction document reader of FIG. 2;

FIG. 6 is a representative diagram of a receipt to be read by transaction document reader of FIG. 2;

FIG. 13 is an additional embodiment of a transaction document to be read by the transaction document reader of FIG. 2;

FIG. 14 is an enlarged view of a portion of the transaction document of FIG. 13;

FIG. 15 is an illustration of an image memory representative of the portion of the transaction document shown in FIG. 14;

FIG. 19 is a schematic illustration of a marking area of a transaction document read by a transaction document reader of FIG. 2 wherein said light source is an alternating light source;

FIG. 20A, 20B, and 20C is a schematic representation of an image memory representative of a marking area when said light source is an alternating color light source;

FIG. 21 is a portion of a transaction document, such as that of FIG. 5, printed in two different colors;

FIG. 22 is a schematic illustration of an image memory representative of the portion of the transaction document shown in FIG. 21;

DETAILED DESCRIPTION OF THE PREFERRED EMBODIMENTS

In the following description of the preferred embodiments, reference is made to the accompanying drawings which form a part hereof, and which show the preferred embodiments. It is to be understood, however, that other embodiments may be utilized and structural changes made without departing from the scope of the present invention.

Figure 1:
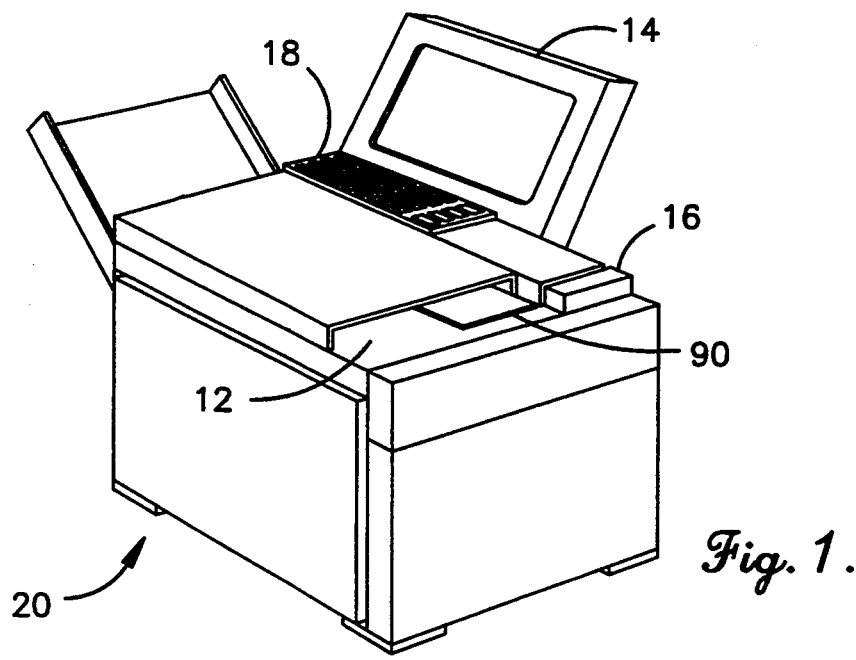
FIG. 1 is a perspective view of a transaction document reader.

FIG. 1 illustrates a transaction document reader 20 and a transaction document 90 placed upon a reader receiving platform 12. Reader 20 includes user input pad 18 and display 14 for facilitating a document transaction. The transaction document 90 is shown in detail in FIG. 5. Transaction documents are used for playing the lottery, for taking tests, for ordering items, etc. The transaction document 90, FIG. 5, includes a character area 92 for printing of predetermined characters 104. Also printed on the transaction document are marking areas 94 for a user to place a handwritten mark therein in order to complete a transaction such as choosing lottery numbers.

The document 90 is placed on reader receiving platform 12 and inserted into reader 20. Therein, the document 90 is transported through the reader 20 by transport mechanism 22. The transaction document reader 20 linearly optically scans the transaction document 90, sensing rows of pixels 102. The pixel areas of the rows are aligned in columns of pixels 100. The transaction document reader 20 includes a linear image CCD sensor 52 which provides analog output signals 53, representative of the rows of pixel areas 102, to the reader circuitry 54 which processes the analog signals 53 on a row by row basis.

The reader circuitry 54 includes a motor control and sensor portion 56 for mechanically controlling the transport mechanism 22 and transaction document reader 20. The output signals 53 from CCD array 52 are applied to transform circuitry 60 under control of CCD array timing control 64. The analog output signals 53 are transformed to single bit signals and stored in image memory 62. The image memory 62 is then probed or interrogated on a dynamic basis by processing and control circuitry 58 under the control of software 68. The single bit signals stored in image memory 62 are probed to recognize whether marks 96 exist on document 90, FIG. 5, and to recognize the predetermined characters 104 in the character area 92 of document 90. It would be readily apparent to one skilled in the art that instead of utilizing single bit signals, that multiple bit signals can be used to implement the transaction document reader system.

Figure 24B:
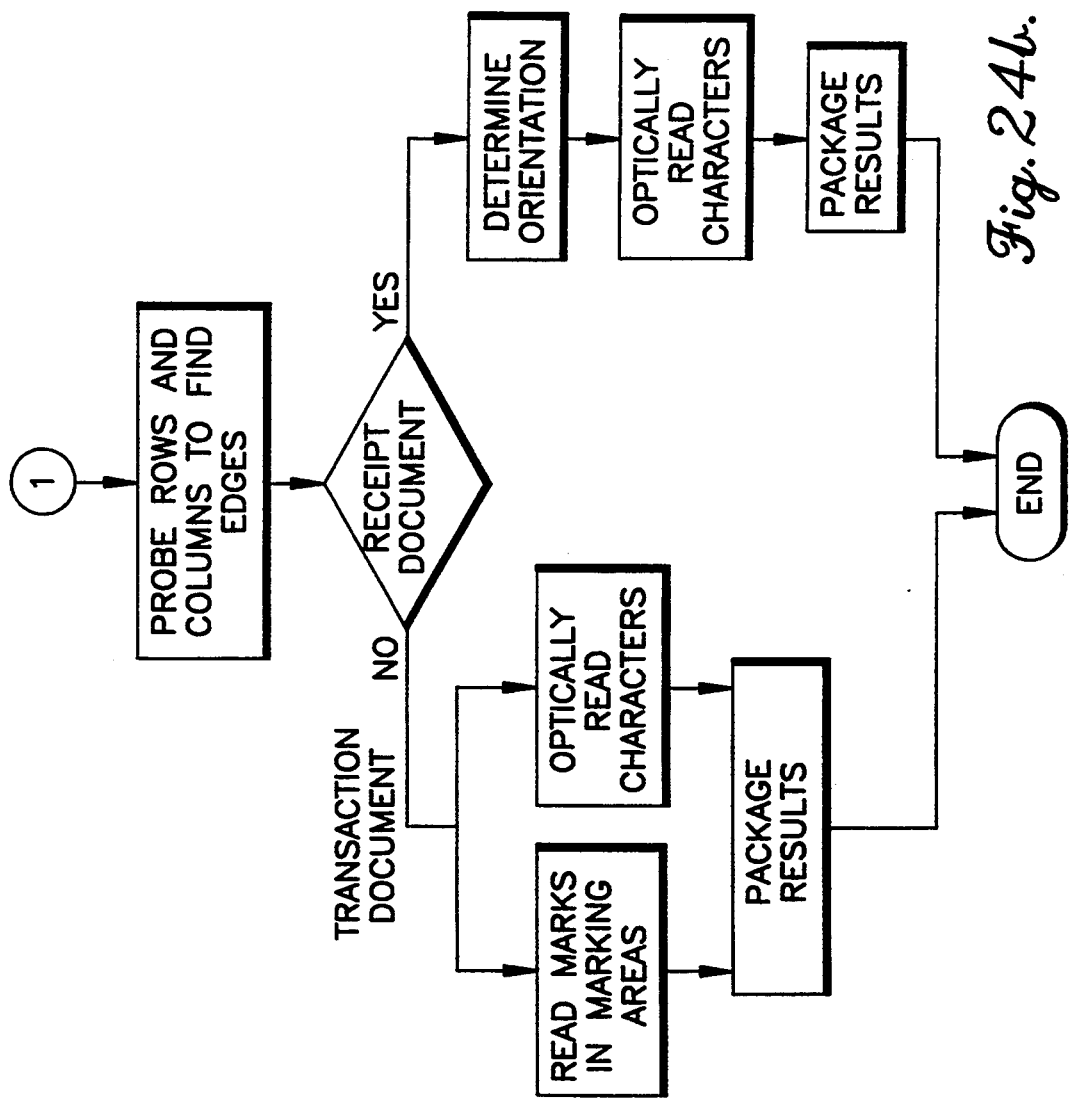
FIG. 24A and 24B is a flow diagram of the reading of image data of the present invention.
Figure 24A:
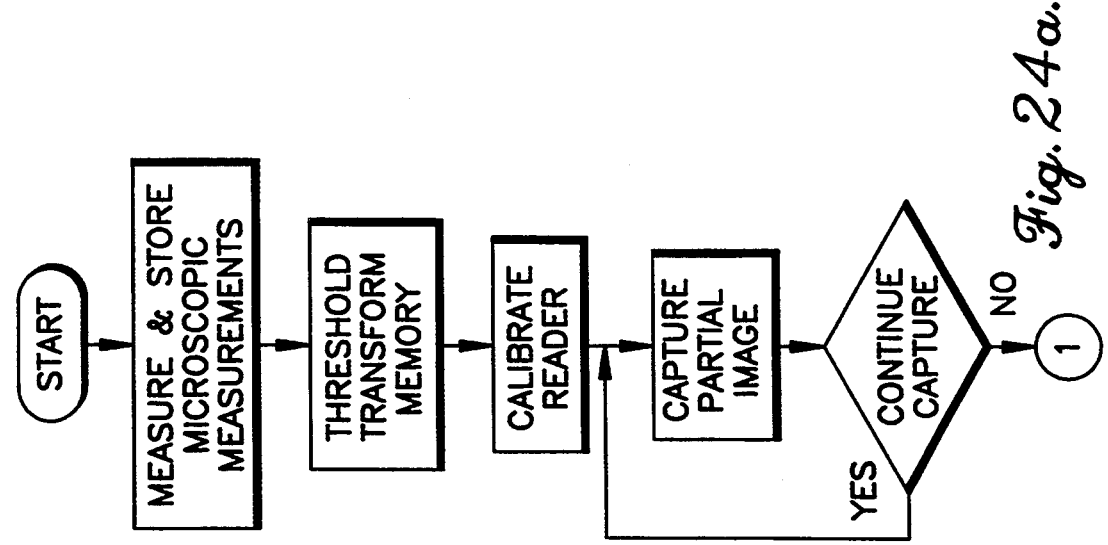

With reference to FIGS. 2-12 and FIGS. 24A, 24B, 25, 26A, 26B, 26C, 27A, and 27B the reading of transaction document 90, FIG. 5, by transaction document reader 20 will be described in further detail. FIG. 24A and 24B generally describes the flow of the system, portions of which are under the control of software 68. Each of the steps generally described in FIG. 24A and 24B shall be described in further detail below and with reference to FIGS. 25, 26A, 26B, 26C, 27A, and 27B.

Transaction document reader 20 includes transport mechanism 22, sensing device 34 and reader circuitry 54. Transaction document 90 is placed, printed material face down, on reader receiving platform 12. As the document is placed over leading edge sensors 26 and rail edge side sensors 24 of the transport mechanism 22, FIG. 2, bias drive roller 28 is activated by motor controller 56, FIG. 4 and document transport is started, FIG. 24A. Bias drive roller 28 is positioned at an angle with respect to the side rail 29, FIG. 3, and drives the document towards the side rail such that the documents rail side edge 106, FIG. 5, is in contact with side rail 29. The bias drive roller 28 keeps the document aligned by keeping the rail side edge of the document orthogonal with the linear scan as the document is transported across window 42 to be sensed by sensing device 34.

Sensing device 34 includes window 42, reflective edge window sensor 36, light sources 38, fixed mirror 46, lenses 48 and 50, and CCD linear image sensor 52. As document 90 is transported by bias drive roller 28 across window 42, the leading edge 104 of document 90 triggers reflective edge window sensor 36 such that light sources 38 are activated to illuminate the document as it is transported across the window 42. By sensing when the document is coming upon the window 42 by means of reflective edge window sensor 36, and initializing illumination accordingly, the time required for light sources 38 to be activated is minimized. Drive rollers 30 are also activated by the sensors 24, 26 and keep the document 90 continuously and constantly moving across the window 42.

As the trailing edge 110 of document 90 triggers trailing edge sensor 32, the motor driving drive rollers 28 and 30 are turned off and document 90 has completed transport through the reader 20. It should be readily apparent that the trailing edge sensor's function can easily be accomplished by setting a predetermined time necessary for the motor driving the rollers 30 and 28 to be activated such that the document is completely transported across the window 42 and automatically shutting off the motor after such predetermined time. The document is transported through the system at a particular speed as a function of the required scanned resolution and document processing time.

Figure 2:
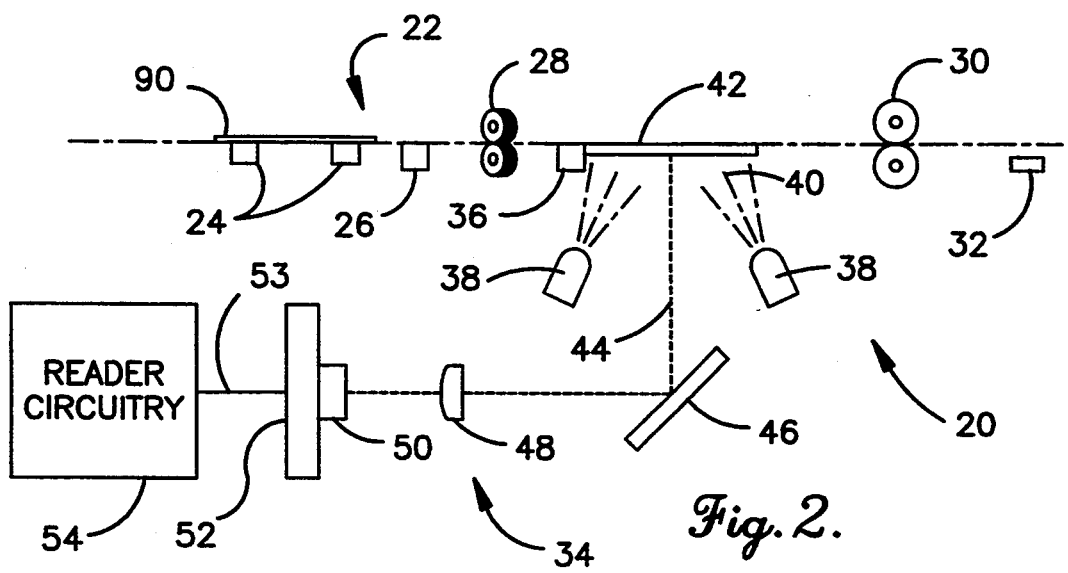
FIG. 2 is a side schematic view of the transaction document reader of FIG. 1.
Figure 3:
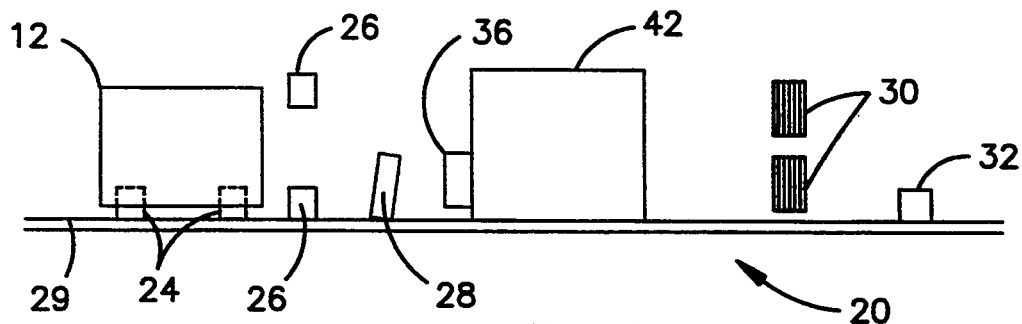
FIG. 3 is a top schematic view of the transaction document reader of FIG. 2.

As shown in FIG. 2 and FIG. 3, document 90 is transported across window 42 and light sources 38 provide illumination thereof via light rays 40. Light sources 38 include either discrete LED's, (Light Emitting Diodes) or LED chips on a board and illuminate the document 90 with a single color of light, normally red or green. Reflected light 44 is reflected from document 90 through window 42 and is then reflected from a front surface mirror 46. The reflected light 44 is focused by image scanning lens 48 onto linear image CCD sensor 52 through field flattening lens 50. The image scanning lens 48 is a 12.5 mm lens, F2.9, manufactured by Universe Kogaku (America), Inc., part number GT-12M. CCD linear image sensor 52 is a sensor such as a LORAL Fairchild Imaging Sensor CCD134 or a Toshiba CCD linear image sensor TCD-132D, 1024-element high-speed linear image sensors.

The linear sensor 52 produces an analog signal for 1024 pixel areas across a row of pixel areas 102 of the document 90 as the document is being scanned. The analog signal outputs 53 are representative of the total light radiation reflected from each pixel area of the row of pixel areas. An analog shift register is clocked periodically under control of CCD array timing control 64 to shift the 1024 analog signals and to clear the linear sensor 52 to receive a new reading of 1024 analog signals of the next row of pixel areas as the document 90 is continuously moved across the window 42. The sensor reads a matrix of 1024 X approximately 1300 pixel areas for a six inch transaction document. To one skilled in the art it should be readily apparent that the number of pixel areas read by the image sensor, the size of the document, and the size of the image data on the document, are easily changed. The illustrative documents described herein are simplified for facilitating description of the transaction document reader.

The analog signals 53 representative of a row of pixel areas 102 from linear CCD sensor 52 are applied to analog digital (A/D) converter 70 of transform circuitry 60. Transform circuitry 60 includes A/D converter 70, transform memory 72, and transform control 74. Analog to digital converter 70 provides a 7-bit output signal representative of the gray scale of each distinct pixel area of the transaction document 90. The 7-bit output signal and signals from transform control 74 representative of the column number of each pixel area in a row, addresses the transform memory 72 to select a single bit signal (one or zero) for each pixel area. The signals from transform control 74 are generated as a function of timing signals from CCD array timing control 64. The single bit signals are then stored in image memory 62. As rows of single bit signals are stored partial image capture is completed, FIG. 24.

Transform memory 72 is a threshold bit map of individual columns in a look-up table form. The thresholding of transform memory loads the memory with a map of desired threshold results. For example, if the threshold value for minimum white for a particular column is 47 of a gray level sensitivity of 128, addresses XX47 and above for an individual column in the lookup table would contain a "1" and addresses XX46 and below would contain "0". Thresholding of transform memory is completed prior to partial image capture of the transaction document 90.

The reading of a plain reflective document, normally white (not shown), thru processing of the reflective document's image in image memory 62, causes the transform memory 72 to be mapped with ones and zeros or single bit signals. The reflective document as it is scanned by document reader 20 identifies the maximum white gray value for each of the 1024 sensor areas of each row of pixel areas by averaging the gray scale values for the pixel areas in each column. The look up table is mapped by setting a predetermined fraction of the maximum white gray scale values, as read by the CCD array when the reflective document is transported across window 42 and scanned by CCD image sensor 52, as the threshold value for the column. The addresses corresponding to the threshold value and the addresses above the threshold value are loaded with ones and those corresponding addresses below the threshold value are loaded with zeros.

The predetermined fraction is typically approximately 40 to 50 percent. For example, if the averaging of gray scale values gives a maximum white of 117 in gray scale value for a particular column of the row, the threshold value is selected as 40 percent of that value or 47. Therefore, addresses corresponding to values 0 to 46 are mapped such that a corresponding pixel area having a gray scale value of 0 to 46 is presumed black or dark and a "0" bit is later read from transform memory, and addresses are mapped such that a corresponding pixel area having a gray scale value of 47 to 127 is presumed white or light and a "1" bit is later read from transform memory 72.

The process of reading the plain reflective document compensates for the lack of uniform illumination by the light source 38 across the row of pixel areas, compensates for reduction of the light reflected by the document as it is focused through side portions of the lenses, and for compensates variations in CCD linear image sensor pixel cells. Reading of the plain reflective document need only be done once unless characteristics of the reader change.

After the transform memory 72 is mapped a transaction document 90 is transported through the reader, and capture of the image data can be accomplished. The 7-bit gray scale values from A/D converter 70 and signals from transform control 74 representative of the column number in the row of pixel areas of the document scanned, look up for the pixel area represented by the 7-bit gray scale value and column position signal whether the pixel area is to be represented by a "1" or a "0" i.e. whether the pixel area is light or dark. If the pixel area is a dark pixel area, a single bit signal, a zero, is provided to image memory 62. If the pixel area is a light pixel area, a single bit signal, a one, is provided to image memory 62. The gray scale value can also be stored in image memory 62.

Image memory 62 is arranged in rows and columns corresponding to the pixel areas sensed by the linear array sensor 52. For example, rows of pixel areas 102 correspond to rows of bits 134, FIG. 8, and columns of pixel areas correspond to columns of bits 132, FIG. 8. Each and every pixel area is used to address transform memory 72 and results in a single bit signal, a zero representing a dark pixel area and a one representing a light pixel area, being stored in image memory 62.

The rows of pixel areas are transformed into single bit signals, on a pixel by pixel basis, and applied to image memory 62 on a pixel by pixel basis. By continuously sensing pixel areas of document 90 and transforming said pixel areas into single bit signals on a pixel by pixel basis, the single bit signals of subsequently sensed rows of pixel areas are transformed and stored in image memory 62 while a portion of the image memory 62 already containing stored single bit signals are interrogated. As such, as shown in FIG. 24, the image partially captured allows for the document to be identified and some marks and characters to be read as the capture of the rest of the document continues.

Figure 4:
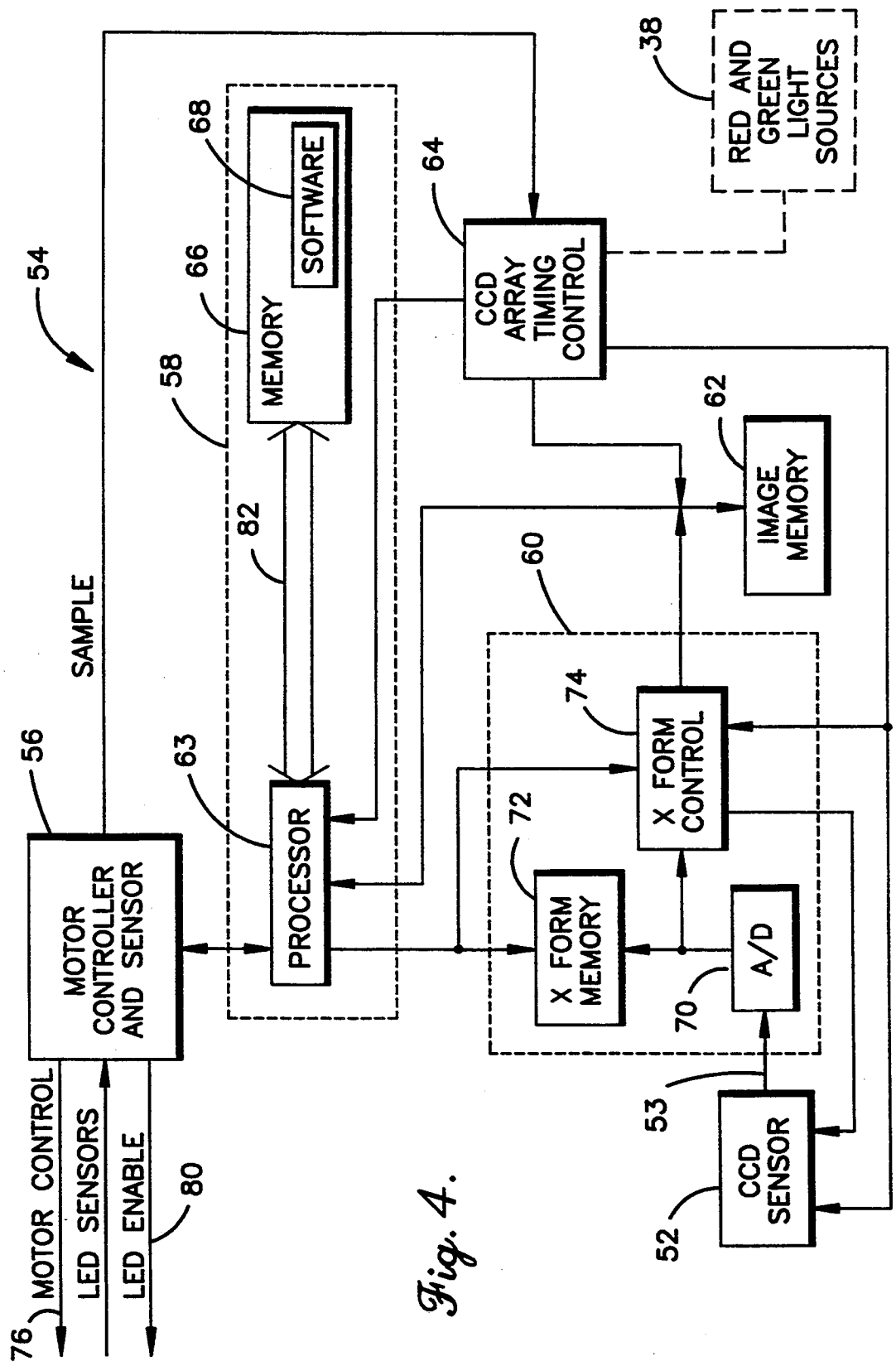
FIG. 4 is a schematic diagram of the reader circuitry of the transaction document reader of FIG. 2.

Motor controller and sensor 56, FIG. 4, receives signals from LED sensors 24, 26, and 36. In response to sensor signals, motor controller and sensor 56 controls the motor by signals 76 which drive the bias drive roller 28 and drive roller 30. Controller and sensor 56 also enable the illumination of the document 90 via a light source 38 per signals on line 80. In addition, the motor controller and sensor provide a timing signal to CCD array timing control 64. Timing control 64 facilitates dynamic capture of the transaction document as it is being sensed and transformed by relaying timing information to image memory 62 and processing and control circuitry 58. Such timing signals are recognized by the circuitry and enable the circuitry under control of software 68 to begin interrogation of image memory 62 for recognition of handwritten marks 96 on document 90 or for optically recognizing the characters 104 thereon. For example, after approximately thirty rows of pixel areas have been sensed, transformed and stored in image memory 62, timing control relays information to processing and control circuitry 58 to begin interrogation of the single bit signals in image memory 62.

Transaction document 90, FIG. 5, includes six marking areas 94, two of which have marks 96 therein. Four of these marking areas 94 are enlarged and illustrated in FIG. 7. Transaction document 90 also includes character area 92 and a signature/address block 98. The edges of transaction document 90 include rail side edge 106, opposite edge 108, leading edge 104 and trailing edge 110.

Figure 9:
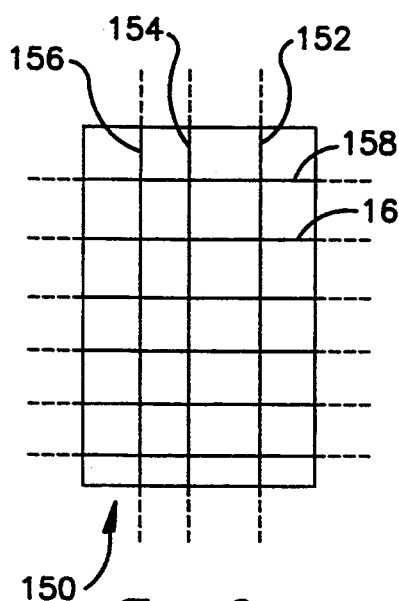
FIG. 9 is a master calibration document for calibrating the transaction document reader of FIG. 2 with respect to the document of FIG. 5.

Prior to scanning and reading transaction document 90 and after thresholding the transform memory 72, a master calibration document 150, FIG. 9, directly corresponding to transaction document 90 is transported through the reader 20 and scanned by linear CCD array 52 to calibrate the reader, FIG. 24A. Master calibration document 150 includes a first vertical calibration line 152 corresponding to the left edge 126 of the first column of marking areas 95. Second vertical calibration line 154 corresponds to left edge 127 of the second line of marking areas 97. Third vertical calibration line 156 corresponds to edge 129 of character area 92. First horizontal calibration line 158 corresponds to edge 128 of a first row of marking areas 131. Second horizontal calibration line 160 corresponds to edge 101 of a second row of marking areas 133.

As master calibration document 150 is transported across window 42 of reader 20, the master calibration document 150 is read by linear CCD sensor 52. While the master calibration document 150 is forced against side rail 29 by bias drive rollers 28, calibration document 150 is scanned beyond both edges of the document. This is illustrated with regard to FIG. 5 where pixel areas scanned extend beyond the side edges of transaction document 90.

Figure 25:
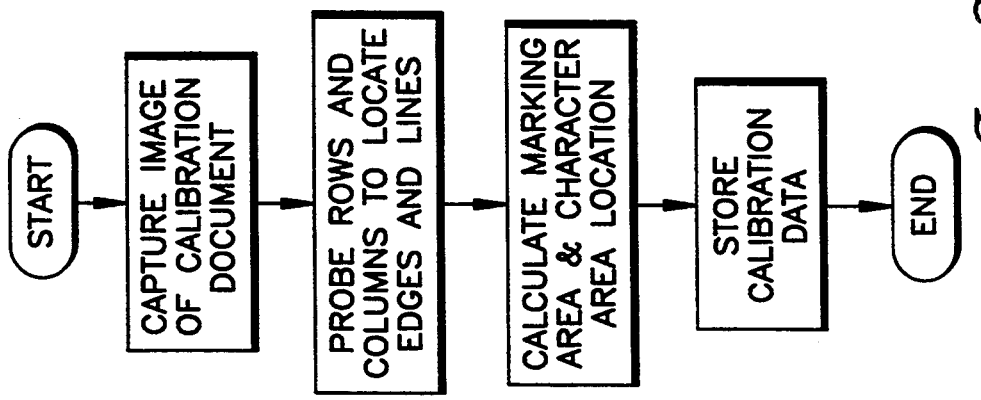
FIG. 25 is a flow diagram of the calibration of the transaction document reader.

As generally described in FIG. 25, after the image data representative of the calibration document 150 is captured and stored, it is probed to locate the edges and lines of the calibration document 150 in image memory 62. The edge of the calibration document against side rail 29 and is found by probing at least one row of single bit signals from one side of the image memory 62 to locate at least one single bit signal representative of a light pixel area. In a similar manner, the edge opposite 108 the rail edge 106 is located in memory for the master calibration document 150 by probing the image memory from the other side. From either of these edges, the first, second and third vertical calibration lines 152, 154, 156 are located in memory and establish the location of marking areas 94 and character area 92 to provide for correction of geometric distortions created by the reader 20 as will be discussed later.

Likewise, the leading edge of master calibration document 150 is located in image memory 62 by probing at least one column of memory to locate a first row of single bit signals representative of the leading edge 104. The first and second horizontal calibration line, 158 and 160, are located accordingly to provide for correction of motion variability compensation as will be discussed later.

In addition, the horizontal and vertical resolution of the reader, pixel areas per inch, is determined. This provides additional information for allowing scaling correction of measurements made when probing image memory. The data from the reading of the master calibration document 150 is stored in a non-volatile portion of memory 66, thus calibration need not be performed again until the reader characteristics change.

Prior to both calibration of the reader 20 and thresholding of transform memory, microscopic measurement of master calibration document 150 and other portions of the transaction document 90 as needed are made, FIG. 24A. Microscopic measurement of the master calibration document 150 is used to establish predetermined distances from the edges of the master calibration document 150 to the marking areas 94 and character area 92. The microscopic measurements are stored in non-volatile portions of memory 66. Thus, when interrogating or probing image memory 62 after rows of pixel areas 102 have been scanned by transaction document reader 20, marking areas 94 and character area 92 can be located in the image memory 62 per the stored distances after the edges have been found.

After the transaction document reader 20 includes stored microscopic measurements, is calibrated via master calibration document 150 and transform memory 72 is mapped, image memory 62 can be probed or interrogated to identify whether handwritten transaction marks are existent in the marking areas 94 and interrogated to read characters in character area 92 dynamically as transaction document 90 is being scanned. The characters are of a predetermined set of characters, such as 0-9.

To determine whether a transaction mark 96 exists in marking areas 94 on transaction document 90, CCD array timing control 64 notifies processing and control circuitry 58, in conjunction with the system clock, when sufficient rows of pixel areas 102 representative of image data on document 90 have been scanned, transformed, and stored in image memory 62 for interrogation of image memory 62 to begin. When, for example, single bit signals representative of thirty rows of pixel areas have been stored in image memory 62, the first row of marking areas 131 can be read. The number of rows needed for the start of interrogation can be easily reprogrammed.

Figure 8:
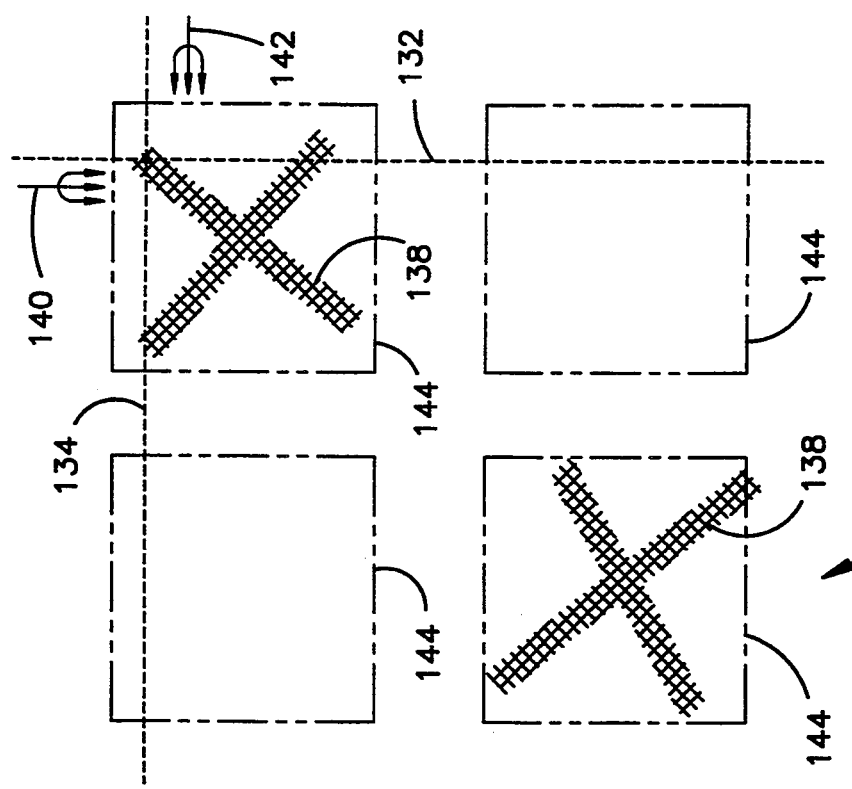
FIG. 8 is an illustration of an image memory representative of the enlarged view of FIG. 6.
Figure 7:
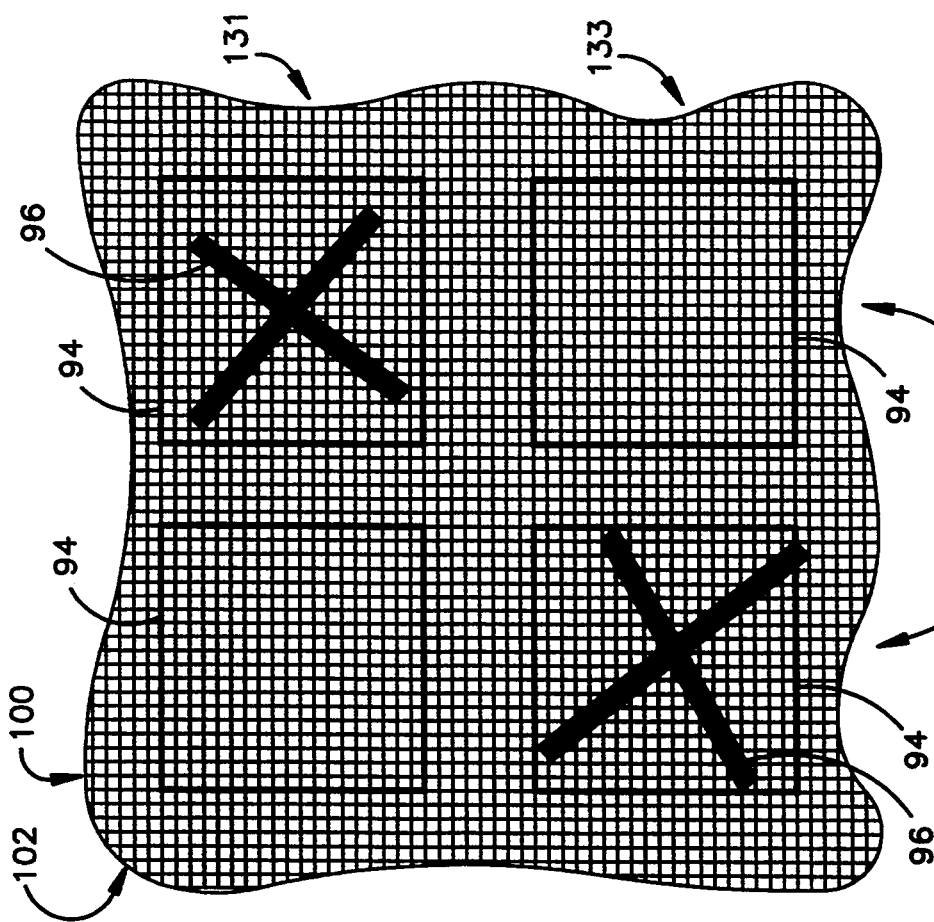
FIG. 7 is an enlarged view of a portion of the transaction document in FIG. 6.

First, the captured rows and columns in image memory 62 are probed to locate the edges of the document 90, FIG. 24. The rows of bits 134 in image memory 130 are interrogated by row probe 142 which can probe three rows of memory portion 130 simultaneously. Image memory 130, FIG. 8, represents a portion of image memory 62 corresponding to the enlarged portion of transaction document in FIG. 7. Rows of pixel areas can be interrogated from both sides of the entire image memory 62. When two or more consecutive light pixels are located by probing the image memory 62 from the sides of the image memory, both edges, rail side edge 106 and opposite edge 108, of the transaction document 90 are located. The width of the document is directly translatable from the number of pixels between the edges 106, 108. The type of transaction document being read is identified from the document's dimensions as each type of transaction document is of certain dimensions.

Likewise, the columns of bits 132 within image memory portion 130 are interrogated by column probe 140. When two or more consecutive light pixels are located by probing the single bit signals in the first several rows of image memory, the leading edge 104 of the transaction document 90 is located. Once the edges 106, 108 and leading edge 104 of the document 90 have been located, the portion of image memory 130 representative of the marking area 94 of transaction document 90, represented in FIG. 8 as the phantom image memory marking area 140, can be located by use of the microscopic measured predetermined distances for that type of transaction document identified stored in non-volatile portions of memory 66.

The marking areas 94 are shown as phantom lines as they are not visible in image memory. They are printed in a color which when it reflects light is above the threshold value and is represented as a one bit signal or a light pixel area. Only the dark pixel areas are represented by the "X" in image memory 130. For example, red marking boxes will be invisible when illuminated by red light sources.

Figure 26A:
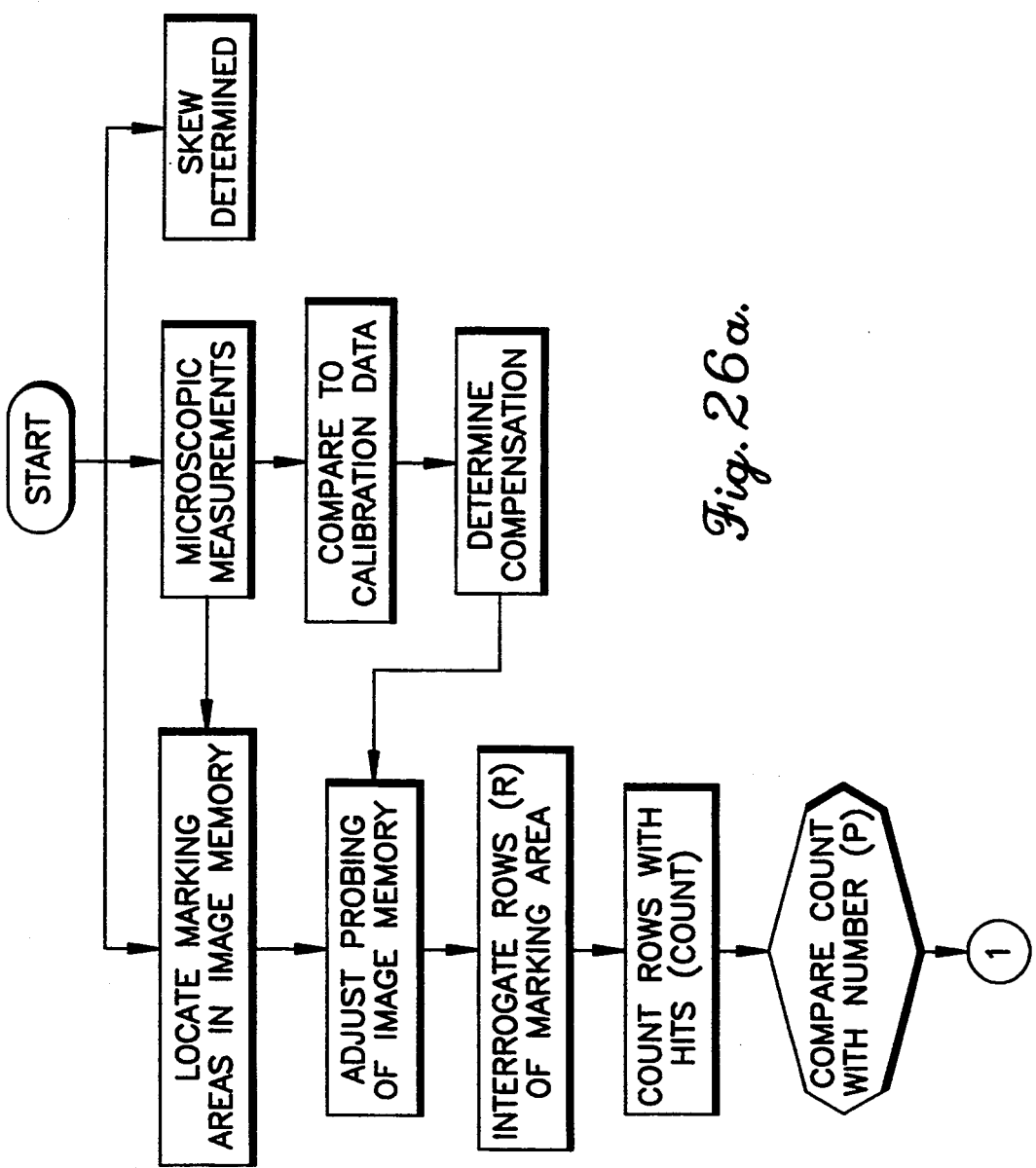
FIG. 26A, 26B, and 26C is a flow diagram of the reading of marking areas of FIG. 24A and 24B.
Figure 26C:
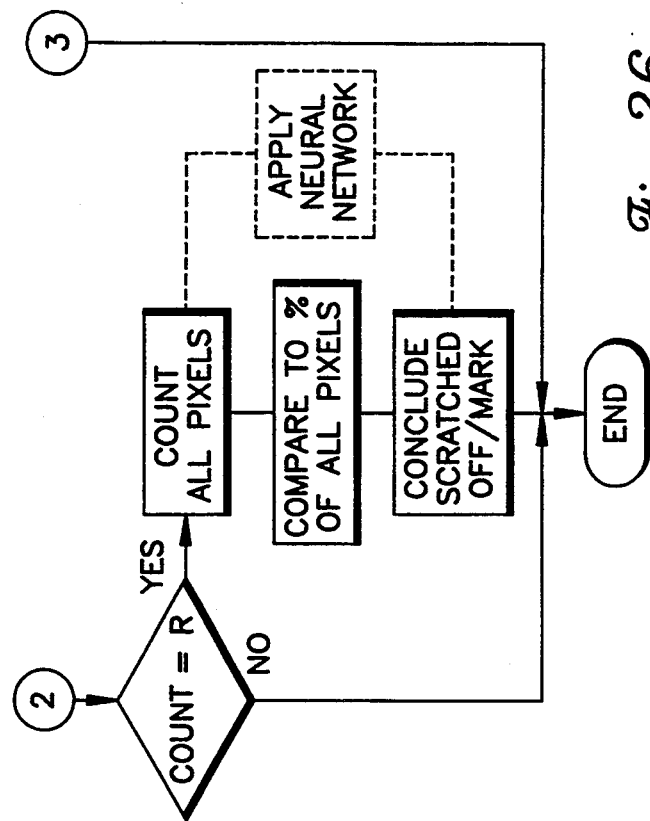
Figure 26B:
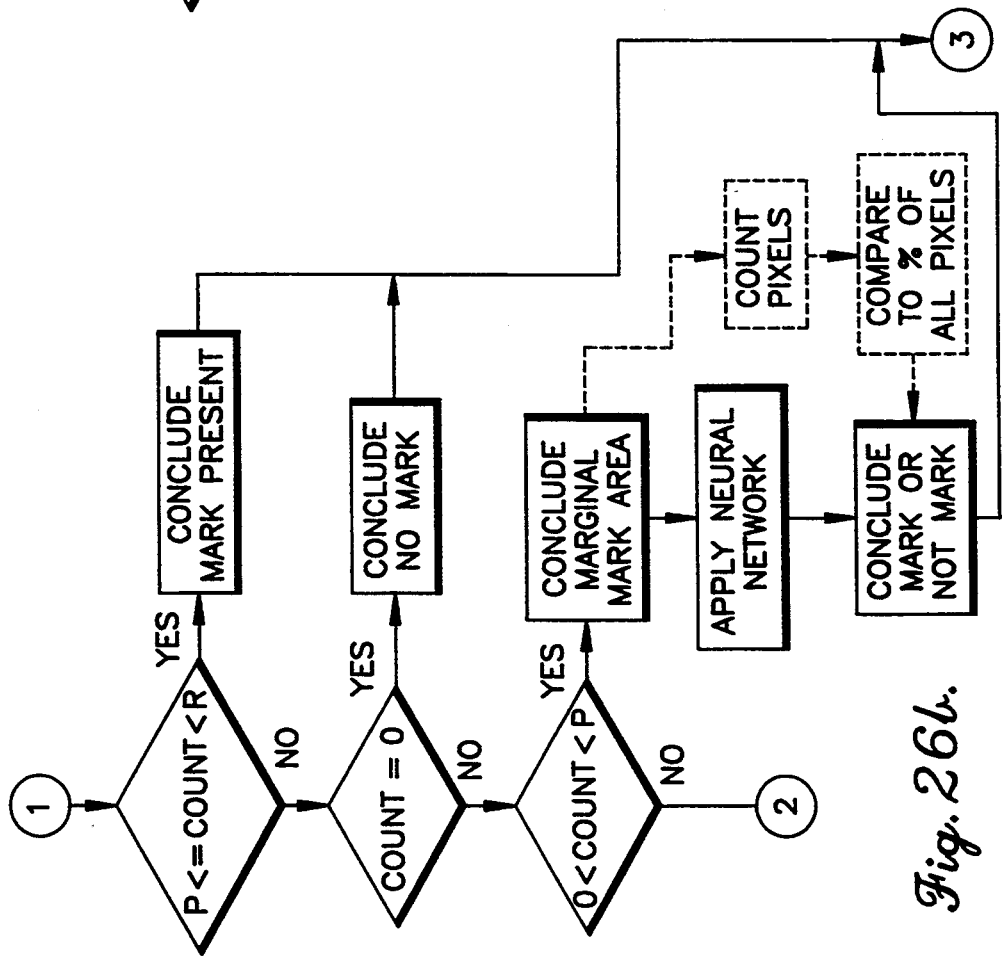

The reading of the mark area is performed as generally described in FIG. 26A, 26B, and 26C. When the portion of image memory representative of the marking area has been located, phantom image marking area 144, that portion of image memory is interrogated by row probe 142 to determine if a mark 96 exists therein. First, a number of rows (R) of single bit signals in image memory 130 representative of the marking area 94 are probed by row probe 142. For example, five rows of the twenty rows may be interrogated. A predetermined number of rows, (P) three rows in the preferred embodiment, wherein hits are located (a hit being the location of at least two consecutive single bit signals representative of dark pixels) is established. As the five rows of single bit signals are being probed within the phantom image memory marking area 144, the rows wherein hits occur (count) are counted and a filtering procedure is applied. If the number of rows where hits occur (count) is greater than or equal to the predetermined number (P), then a mark is identified as being located in this marking area. If no hits are located within the rows of single bit signals, then a mark does not exist in the marking area. If, however, one or more, but less than the predetermined number (P) of rows of single bit signals within phantom marking area 144 are found to contain hits, this marking area is considered a marginal marking area.

The marginal marking area is further filtered to determine if a mark exists therein. One method used to filter the marginal area is by counting the number of single bit signals within the phantom image memory marking area 144 of image memory 130 which are representative of dark pixels. If the number of dark pixels is greater than a predetermined number established by a predetermined percentage of all pixel areas, for example 35 in a 20 by 20 pixel marking area, then a mark exists therein.

In another embodiment of the invention, the filtering of the marginal marking area is accomplished by applying a neural network to the portion of image memory representative of the marking area to determine whether a mark exists therein. The neural network is trained to recognize such a mark in the manner neural networks are normally trained and as known in the art.

If all the rows of single bit signals probed locate a hit, then it is possible that the user who made the handwritten mark attempted to scratch out the mark and the entire marking area may be represented in memory by dark pixels. To filter this type of marking area, one method used is to count all the dark pixels which appear in the marking area 144 and compare the count to a predetermined percentage of overall single bit signals in the marking area 144, for example, 92%. If the count is larger than that percentage, then the user scratched out the handwritten mark.

In another embodiment of the invention, the filtering of a possible scratched out mark is accomplished by applying a neural network to the portion of image memory representative of the marking area to determine if a mark is scratched out. The neural network is trained to recognize such a scratched out mark in the manner neural networks are normally trained and as is known in the art.

Further, although the above description probes rows of single bit signals, the probing within the image memory marking area can also be done on columns within the marking area. Even diagonal lines of single bit signals within the marking area can be probed to read the mark. For example, five diagonal lines of single bit signals can be probed and the count of hits in these lines can be filtered. Thus, any line of pixel areas across the marking area can be probed.

It is readily known in the art that any number of pixel areas can be set to designate a hit, any number of rows may be probed to determined if a mark exists, a row or column probe can probe any number of rows or columns simultaneously, and any number of consecutive pixel areas, whether dark or light can be chosen when attempting to conclude that an area or edge of the document has been found. For example, the number of rows of single bit signals in phantom image memory marking area 144 interrogated to determine whether a mark exists could easily be ten or three instead of five.

Figure 10:
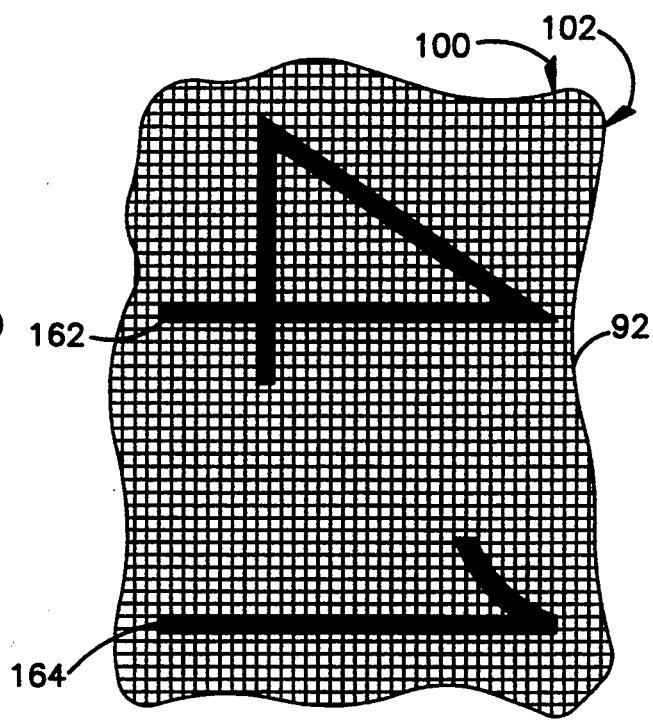
FIG. 10 is an enlarged view of a portion of the transaction document of FIG. 5.
Figure 27A:
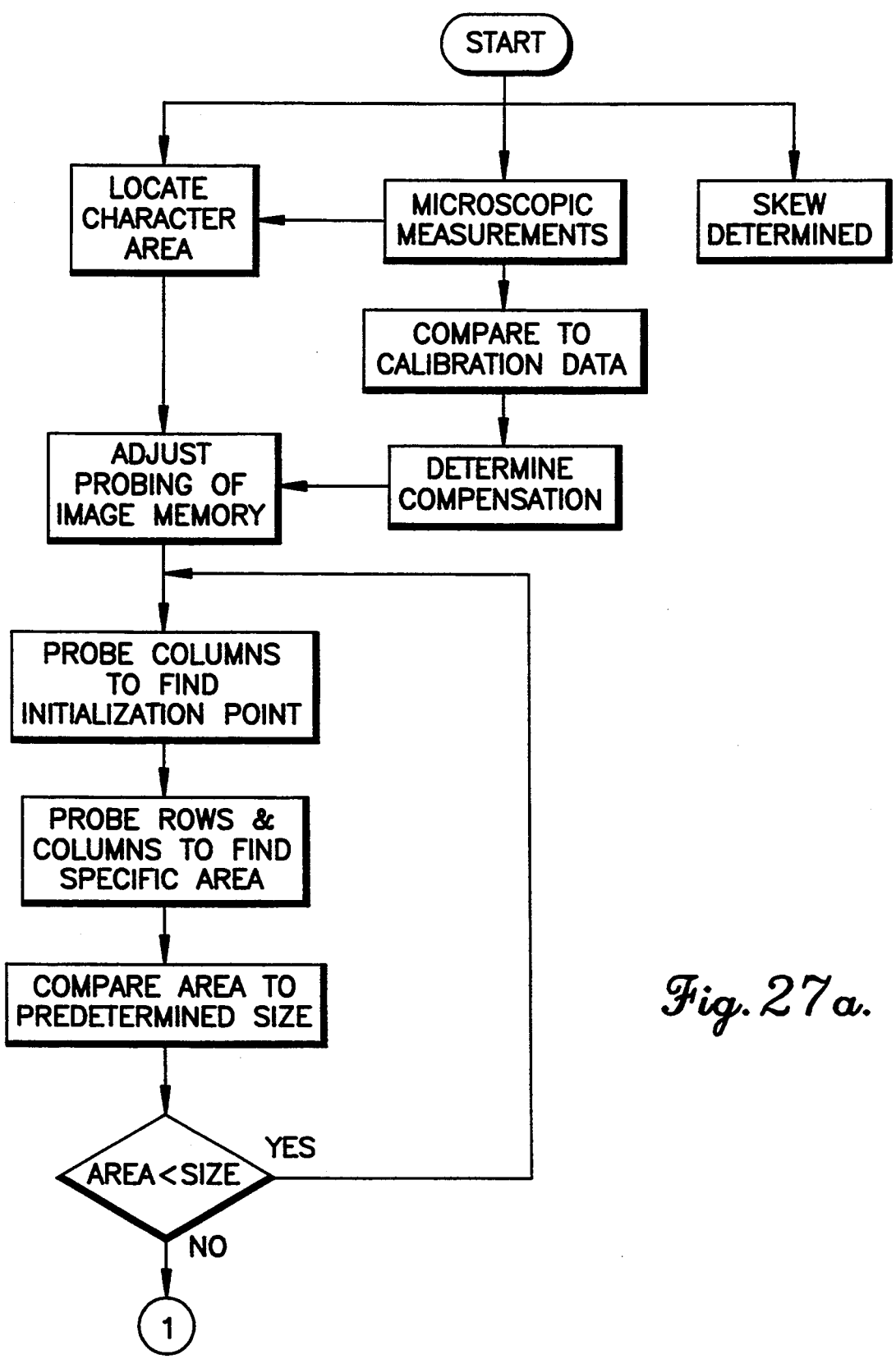
FIG. 27A and 27B is a flow diagram of the optical reading of characters of FIG. 24A and 24B.
Figure 27B:
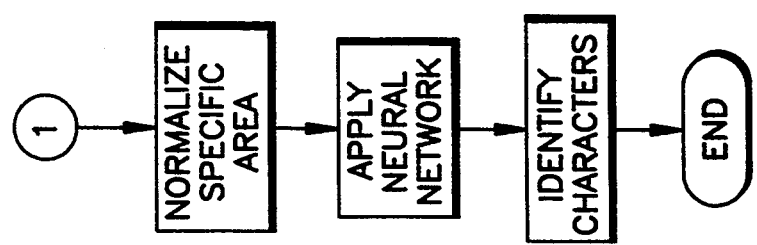

With reference to FIG. 27A and 27B the optical reading of characters is described. The character area 92 of transaction document 90 is located by means of the edges of the document and predetermined distances established by the stored microscopic measurements in the same manner as the marking areas 94 were located, as discussed above. Once a portion of the character area 92 encompassing the character "4", enlarged in FIG. 10, is stored in image memory 62, the single bit signals representative of pixel areas are interrogated therein to recognize the character.

Figure 11:
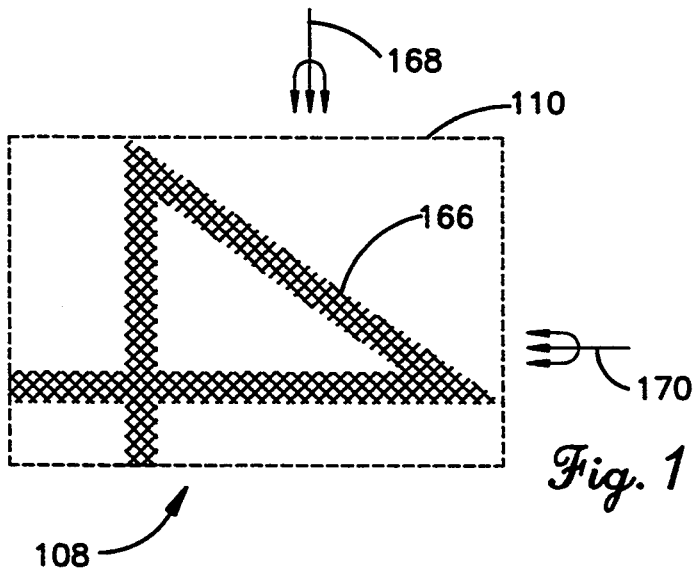
FIG. 11 is an illustration of the image memory representative of the portion of FIG. 10.

FIG. 11 illustrates the probing of image memory 62 to define a specific area 110 wherein a single character 166 is located. Image memory portion 108 is probed from the leading edge of the transaction document 90 by column probe 168. If the column probe does not locate a first hit (two consecutive single bit signals representative of dark pixel), then columns on both sides of those previously probed are interrogated until such a column with a first hit is located. The single bit signals located by the first hit are utilized as an initialization point.

From the initialization point, columns adjacent these initial single bit signals are interrogated to find hits adjacent to the initialization point. As the probes are moved, column to column, hits being continuously located on both sides of the initialization point, the sides of a specific area 110 are defined at the point where no further hits are located. In a like manner row probe 170 is utilized to probe the rows adjacent the single bit signals at the initialization point to establish an upper and lower segment of specific area 110. Thus, a specific area 110 encompasses the entire single character 166. The specific area 110 located within image memory portion 108 is then compared to a predetermined area to access whether the size of the specific area is large enough to encompass a single character. If not large enough, the reader tries to locate a new specific area.

Figure 12:
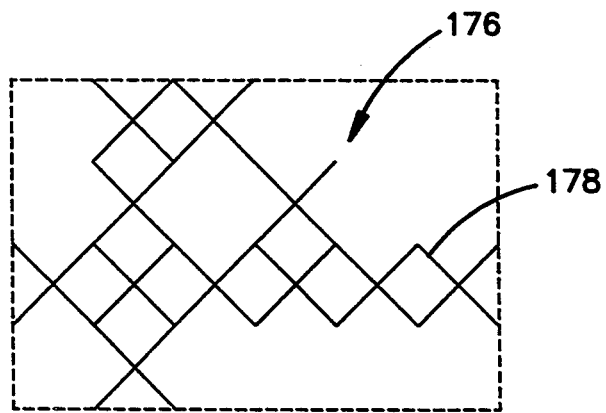
FIG. 12 is a schematic representation of a normalized FIG. 11.

After the specific area 110 is located, it is normalized in a manner as is readily known in the art. FIG. 12 is the specific area 110 wherein the character "4" has been normalized. Each "X" 178, FIG. 12, represents stored signals in memory 66 of whether a certain area of image memory 108 contains a predetermined number of single bit signals representative of dark pixels.

Once the specific area 110 has been normalized and stored in memory 66, a neural network is applied to the normalized area to determine the identity of the single character. A limited number of characters, for example 0 through 9, are utilized in the invention to facilitate simple training of the neural network. In the training, for example, the neural network is exposed to approximately 1,000–3,000 normalized patterns representative of a numeral "4", floating point decimal is eliminated, and back propagation is used to adjust the network if it does not recognize the proper character. Such training of neural networks is readily known in the art. When applying the neural network to the normalized first character 176, FIG. 12, only a two layer neural network is utilized.

After a first specific area 110 is located, a second specific area, which would encompass the numeral "1", is easily located by dropping a column probe from the specific area 110 down the columns until a hit is located in image memory which would be representative of the next character. Thus, the character area 92 need not be located again, and a specific row of columns is probed to find the initialization point of the next character "1".

While it is being determined whether a mark exists in the first row of marking areas 131, further pixel areas are being sensed, transformed into single bit signals and stored in image memory 62. Thus, transaction document reader 20 is dynamically capturing the data on transaction document 90 as it is transported through the reader 20. By performing the identification of marks 96 in the first row of marking areas 131, while simultaneously transforming and storing further single bit signals, the speed of reading the marking areas of transaction document 90 is greatly increased.

Likewise, as the single bit signals representative of the character "4" are being interrogated and the character recognized, the pixel areas representative of the character "1" are being sensed, transformed into single bit signals, and stored in image memory 62. Once again, this dynamic capture and optical character recognition of these characters increases the speed upon which several characters on a transaction document can be read.

FIG. 6 shows a receipt 120 which is read by transaction document reader 20. The dimensions of the receipt 120 can be determined by probing the rows and columns of single bit signals representative of the pixel areas in the same manner as probed with regard to transaction document 90. The dimensions of receipt 120 correspond to a specific receipt document which the transaction document reader 20 will identify from predetermined stored information concerning its dimensions. The reader is able to distinguish between the transaction document 90 and the receipt 120 by determining the width or dimensions of the document.

Only a few rows of single bit signals need to be probed to determine the width and as such to determine the type of document being read. Therefore, only a small portion of the document is read prior to identifying the document to facilitate further reading of image data on the document. As shown in FIG. 24, when the receipt document is identified the orientation of the document is determined from the receipt dimensions. The characters representative of the receipt number 124 are read in the same manner as predetermined characters 104 were read as discussed above with regard to transaction document 90. Thus, it is recognized that the types of documents which can be read by transaction document reader 20 are numerous.

FIGS. 13-16 illustrate the use of the transaction document reader 20 with a transaction document 180 having a certain number of strobes or timing marks 184 thereon. Although the reading of transaction document 180 is similar to the reading of transaction document 90, the use of strobes or timing marks 184 provides a different marking area and character area location process. The document 180 of FIG. 13 includes marking areas 182, marks 186 therein, and a character area 183, all of which are similar to transaction document 90. The difference between transaction document 90 and transaction document 180 is the inclusion of timing marks 184.

Figure 16:
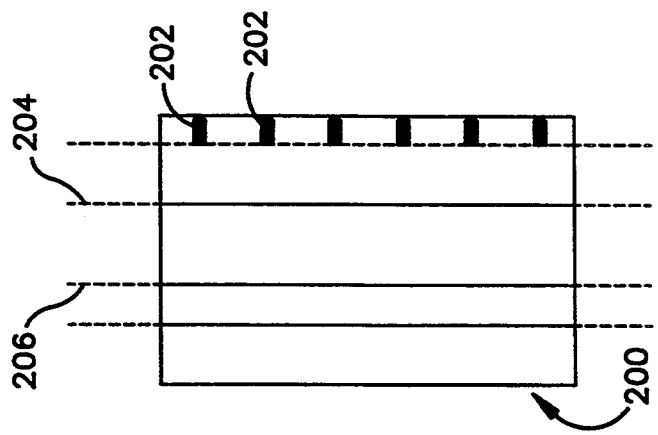
FIG. 16 is an illustration of a master calibration document used to calibrate the transaction document reader of FIG. 2 with respect to the document of FIG. 13.

To calibrate the transaction document reader 20, master document 200, FIG. 16, is transported through the reader 20, sensed, transformed, and stored to provide an image map of transaction document 180. Master calibration document 200 includes calibration marks 202, a first vertical master line 204 which corresponds to the left edge of a first column of marking areas 177, and a second vertical master line 206 corresponding to the left edge of a second column of marking areas 173. Horizontal lines as used with transaction document 90 are unnecessary as the top and bottom of a marking area can be located by counting the number of pixel rows from the leading edge of the document within the image memory, and vertical or motion variability compensation can be accomplished by means of the timing marks instead of horizontal calibration lines, as shall be discussed further below.

Microscopic measurement data of the transaction document 180 are stored in memory so that the marking areas 182 and character areas 183 can be located with respect to the timing marks 184 on the document. The microscopic measurements are made between the timing marks 184 and the marking areas 182, and also with regard to the leading edge 203 and marking areas 182.

As discussed previously with regard to transaction document 90, the sides of transaction document 180 are located to determine the width of the document which corresponds to a specific type of transaction document. The image memory is further interrogated to locate the leading edge 203 of the transaction document 180 by probing several columns of several rows of image memory with column probe 192, FIG. 15. Once the leading edge 203 of the document in image memory 62 is located, column probe 192 probes a predetermined number of columns wherein transformed timing mark 190 is represented by single bit signals. The probe 192 is commonly a three column probe.

Once a hit is located representative of a first mark 185, columns adjacent thereto are probed to locate the left edge of the mark. After the left edge is located the left edges of the marking boxes can be found from the predetermined microscopic measurements stored in memory. The other sides of the phantom image memory marking area 196 can be ascertained from stored measurements from the leading edge 203 of the document 180 and the dimensions of the marking area 196 itself. As previously described, now that the phantom image memory marking area 196 located within image memory portion 198 is found, further interrogation of the single bit signals within said phantom image memory marking area 196 is performed to determine if a mark 182 exists therein.

Once a first timing mark 185 is located in image memory and the left edge of the timing mark 185 is found, the center of the strobe can be found from known stored dimensions of the timing mark. A second timing mark 187 can be located in image memory by dropping a probe from the first timing mark center and down columns therefrom. When the second timing mark 187 is located, the marking areas in the row corresponding to the second timing mark can be located within image memory 62. Further, the characters within character area 183 are read in a manner similar to the locating and reading of the character area of transaction document 90.

Documents with pre-defined row or column timing marks or strobes, may be processed with the process as described above with reference to document 180. These documents may also be processed without reference to the pre-defined timing marks as described above with reference to transaction document 90. The pre-defined timing marks are optional.

Figure 18A:
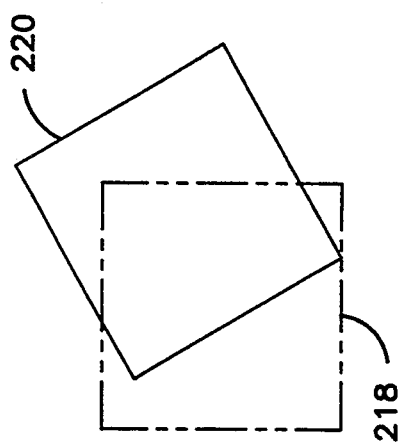
FIG. 18A, 18B, and 18C are schematic representations of distortions requiring compensation.
Figure 18C:
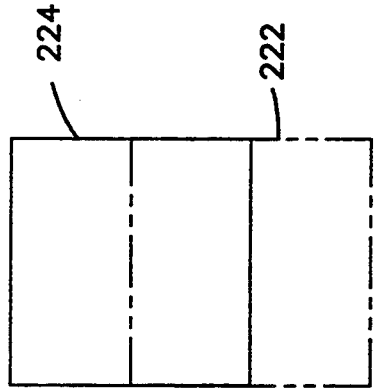
Figure 18B:
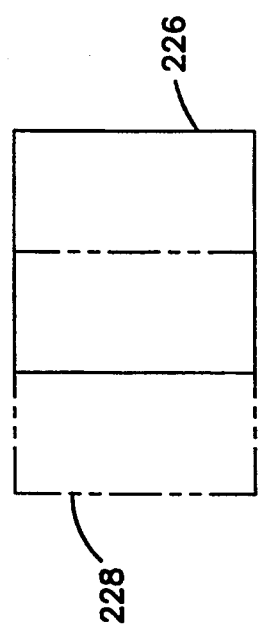

In order to correctly identify the marks and characters on the transaction documents, compensation for various distortions are provided by adjusting the probing of image memory 62, as generally shown in FIG. 26A and 27A. First, geometric distortion as a result of the sensing device 34 scanning the rows of pixel areas of a transaction document is compensated. Some of the distortion is caused by the lenses used therein. FIG. 18B illustrates the distortion. The actual marking area 226 corresponds to the marking area as measured on a transaction document. The dashed image memory marking area 228 corresponds to the portion of image memory representative of the actual marking area 226. As illustrated, the marking area in image memory 228 may be offset from the actual marking area 226 of the transaction document.

The master calibration document 150, FIG. 9, is utilized to gather data to compensate for this geometric distortion caused by the lenses of the sensing device 34. The first, second and third vertical calibration lines 152, 154, 156 are utilized to properly locate the marking areas within the image memory. For example, if when the transaction document reader 20 is calibrated, the first calibration line 152 is located 100 pixel areas from the edge of the master document 150 as shown in image memory 62, then if the actual distance on the master document is 80 pixel Areas, a correction factor of 20 would be utilized to properly locate the single bit signals representative of the pixel areas within the marking area.

The actual bits within image memory 62 are not adjusted. Rather, the correction factor is utilized when interrogating the image memory 62 storing data of transaction document 90 such that, as the column probe 140, FIG. 8, are interrogating the marking area, the proper single bit signals within the image memory 62 are probed. By adjusting the probe rather than restructuring and recalculating the image memory, compensation time is reduced. For example, if a column probe was to probe the single bit signal representative of the 80th pixel area from the edge 108 of the transaction document 90, the single bit signal representative of the 100th pixel area would be probed instead. The same geometric distortion correction applies with regard to the reading of transaction document 180 as applies to transaction document 90.

Distortion along the columns of pixel areas is created by the motion variability of the transaction document 90 as it is transported across window 42 of the sensing device 34. This distortion is shown by FIG. 18C. The actual marking area 224 may be slightly offset from the marking area in image memory as represented by the dashed line 222.

When reading the transaction document 90, the first and second horizontal calibration lines 158 and 160, FIG. 9, provide for motion variability compensation in the vertical direction in a manner similar to geometric distortion compensation.

There are a predetermined number of pixel areas between the leading edge of the actual master document and the first horizontal calibration line 158. When the master document 150 is transported and scanned by the transaction document reader 20, the first horizontal calibration line 158 is determined to be offset in image memory 62 a certain number of pixels from its actual pixel distance from the leading edge. As such, the difference between the actual pixel areas and the pixels in image memory provides a correction factor for adjusting the probes as the image memory 62 is interrogated, such that the row probe 142 probes the correct single bit signals in the columns of single bit signals representative of the pixel areas within marking area 94. For example, if there is a correction factor of 20 and the row probe was to probe the 80th pixel in a column from the leading edge of the document, the row probe would probe the 100th pixel instead. Such compensation is also provided by the second horizontal calibration line 160.

When reading a transaction document having a number of timing marks 184, FIG. 13, the spacing between the timing marks 184 is utilized to compensate for motion variability distortion while transaction document 180 is transported, and rows of pixel areas are sensed, transformed and stored in image memory 62. For example, the actual distance between the timing marks is known and stored as a certain distance. When the actual transaction document 180 is read by the transaction document reader 20, the space between the timing marks may be a different number of pixel areas than that on the actual document. As such, the difference between the number of pixel areas in the image memory and that as determined by measurement of the actual document defines a correction factor. The correction factor is then utilized to adjust the probing of the rows of single bit signals in the image memory to properly probe the correct rows representative of the marking area 182.

Figure 17:
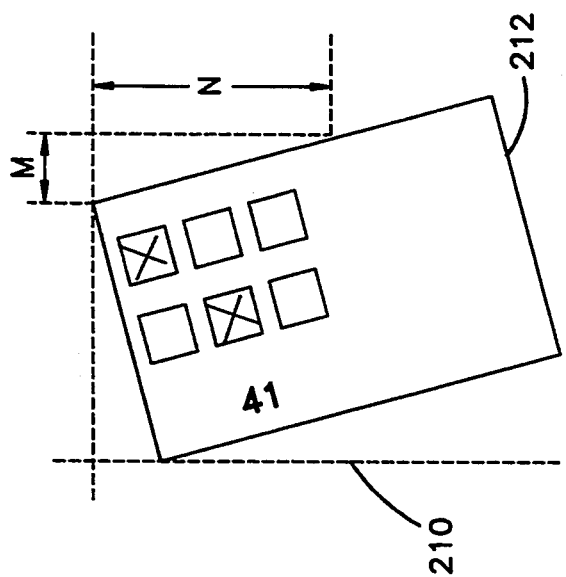
FIG. 17 is a schematic illustration for compensating for misalignment of a transaction document as it is transported and read by the transaction document reader of FIG. 2.

Although the bias drive roller 28 forces the transaction document 90 against the side rail 29 of the document reader such that misalignment is virtually eliminated, if the document 90 is not transported through the reader 20 such that the leading edge 104 is parallel to the linear array sensor 52, skew distortion will occur. FIG. 17 and 18A illustrate this distortion. For example, actual marking area 220 will be skewed in the image memory 62 relative to its unskewed position, the dashed line area 218. The skew of the document 90 as it is transported through the reader 20 can be determined by reading the M and N distances as shown in FIG. 17. An M/N ratio is used to adjust the probing of the pixel areas so that interrogation of correct single bit signals in image memory 62 provided. This adjustment is made for both the column probe 140 and the row probe 142 as skew distorts both rows and columns of pixel areas.

In addition, the amount of skew can be determined by the deviation of the rail edge of the document in image memory from the location of calibrated rail edge of the master document as stored in memory 66. This deviation, or triangle formed by a skewed document, as is shown in FIG. 17 along line 210 can also be used to calculate skew correction.

If a transaction document includes marks 184, such as transaction document 180, then the slope of the marks 184 in image memory can be used to determine the adjustment ratio.

It is emphasized that the addresses of the single bit signals are not changed within the image memory 62 to compensate for any of the previously mentioned distortions. Rather, the probing of the single bit signals in image memory 62 under the control of software 68 is adjusted by the correction factors as discussed above. By adjusting the probing rather than the actual memory, such compensation is accomplished on a pixel by pixel basis as needed, rather than awaiting adjustment of an entire image memory, thus reducing the time required for such compensation.

In another embodiment of the invention, the light sources 38 of sensing device 34, FIG. 2 and FIG. 4, are red and green light sources, preferably red and green LED's. With use of the red and green LED's, red and green printed data becomes visible in image memory 62, thus allowing red and green features on transaction document 90 to be read.

The red and green LED's are operatively positioned to uniformly illuminate the entire width of a transaction document transported across window 42 with each of the colors, red and green. The LED's are switched approximately every few hundred microsecond, enabling the selection of the color of illumination in the interval between successive scans and sensing of rows of pixel areas 102 of the document as it is being transported across the window 42. The red and green LED's alternately illuminate the rows of pixel areas 102 under the control of CCD array timing control 64.

The transform memory 72 is mapped with red and green threshold mapping. Ones and zeros are mapped in a similar manner as when only dark and light pixels were considered. The transform memory is a 32K memory organized 256×128. With red/green mapping, the upper nibble is used for green threshold mapping and the lower nibble used for red mapping. The reading of a plain reflective document once again maps the transform memory with ones and zeros. By averaging the gray scale values and applying a predetermined threshold percentage, a threshold value is determined and the addresses are loaded accordingly.

When a transaction document printed with red and green is read, both the red and green light emitted from the respective LED's will reflect back from white or light printing to the linear CCD sensor 52 at a level above the respective threshold values for the green and red illumination such that output signals representative of light pixel areas are provided. Green light is reflected back to the CCD sensor 52 from green printing of the correct wavelength at a value above the green threshold values, and output signals representative of light pixels are provided. The same green printing does not reflect light above the red threshold value when illuminated with the red LED's light. Therefore, an output signal representative of a dark pixel is provided. Red light is reflected back to the CCD image sensor 52 from red printing of the correct wavelength at a value above the red threshold values. The same red printing does not reflect light above the green threshold value when illuminated by the green LED's light. Therefore, output signals representative of dark pixels are provided when red printing is illuminated by green LED's. Black printing or dark printing not containing either green or red is not reflected above the respective threshold value back to the CCD linear image sensor 52, and thus output signals representative of dark or black pixel areas are provided whether the black printing is illuminated by green or red LED's.

The LED lighting is synchronized such that rows of pixels 102 which are even numbered in the image memory 62 are always illuminated with red and, conversely, rows of pixels 102 which are odd numbered in image memory are always illuminated with green. Thus, as shown in FIG. 19, a green field 232 which makes red printing visible and a red field 234 making green printing visible in image memory 62 is created. As long as the lighting is synchronized, proper image processing can be performed. Therefore, as one probes through the memory array, row by row, which color LED was the cause of any reflection that was above the threshold values is determined. Conversely, it is determined which color is absent, including white, in the absence of any light above the threshold value for that color LED.

In addition to synchronization of the input of the image memory 62 with respect to the color LED illuminating the document, it is also necessary to maintain synchronization of the transform memory 72 so that the addresses mapped according to the threshold values for a column in the row of pixel areas 102 are those mapped for the corresponding color LED.

When the transform memory is mapped, the capture of image data from the document can be accomplished. The 7-bit intensity output signal from A/D converter 70 for a pixel area in a row of scanned pixel areas, a bit position signal from transform control 74 representative of the column number of the pixel area, and a second bit signal from transform control 74 representative of the nibble which was used for mapping the particular light source color, look up for the pixel area whether the pixel area is to be represented by a "1" or "0". As discussed with the single color light source, the image memory stores these single bit signals which are generated on a pixel by pixel basis.

A black marking box 230 illuminated alternately with a red LED and a green LED is shown in FIG. 19. The red illuminated rows of pixel areas create a red field 234 and the green illuminated rows of pixel areas create a green field 232. Any red printing is captured in the green field 232, and green printed images or features are captured in the red field 234.

Traditionally, by use of filters and other techniques, document fields having different colored printing have been illuminated by topologically isolating color light sources, or illuminated by a broad spectrum light source and topologically filtering the reflected light. For example, one quarter of the document printed in green would be illuminated by red filtered light, and three quarters of the document printed in red would be illuminated by green filtered light. Such topological isolation of color light sources upon a particular document leads to inflexibility in design and mechanical and illumination problems at the transition between the red printed portion of the document and a green printed portion of the document. By alternately illuminating the rows of pixel areas of the document, the problems of inflexible design and transition boundary are eliminated.

By providing a red and green image field through alternate illumination of the document, red and green printing can be placed anywhere on the document. This flexibility leads to a document topological layout that can be aesthetically pleasing, in that the colors no longer need to be topologically separated in a spacial layout. In addition, numerous choices can be made as to what shall be visible and invisible in the image memory 62. For example, the marking area could be printed in red and thus become visible by illumination with green light, while strobes could be printed in green and thus become visible in the red field 234.

FIG. 20A illustrates a black marking area after illumination by alternating green and red LEDs, transformed, and stored in image memory 62. The black features are seen in both the red and green image fields 234, 232 as neither the red or green light will reflect above the red or green threshold values for the red and green fields 234, 232. FIG. 20B illustrates in red field 234 the black marking area. FIG. 20C shows the black marking area in green field 232. Black features do not reflect light above the threshold values of the green or red LED's and are therefore, visible in both fields.

The flexibility of utilizing various printed colors and the alternating green LED and red LED illumination of the document, with those printed colors thereon, is demonstrated in FIGS. 21 and 22. In FIG. 21, the marking areas 244 are printed in green and the timing marks 246 are printed in red. As the green marking area and red timing mark are sensed, transformed and stored in a portion of image memory 62, FIG. 22, the single bit signals of the transformed green marking area 248 can be probed in the red field such that the marking area 244 can be located in image memory. This facilitates location of the marking area in image memory. Handwritten marks which are made therein in black would appear in both the red and green fields and single bit signals representative of the marking area are probed to determine if a handwritten mark exists therein. In addition, the green field could be probed to find the transformed red timing mark 252.

To identify whether a handwritten mark exists in a marking area, either the red or green field can be probed, rather than the whole box as discussed previously, when describing the reading of transaction document 90. If a marginal marking area is located, only the pixel areas of either of the fields needs to be counted to determine if a mark exists. This reduces the amount of time required to recognize handwritten marks in the marginal areas.

Figure 28:
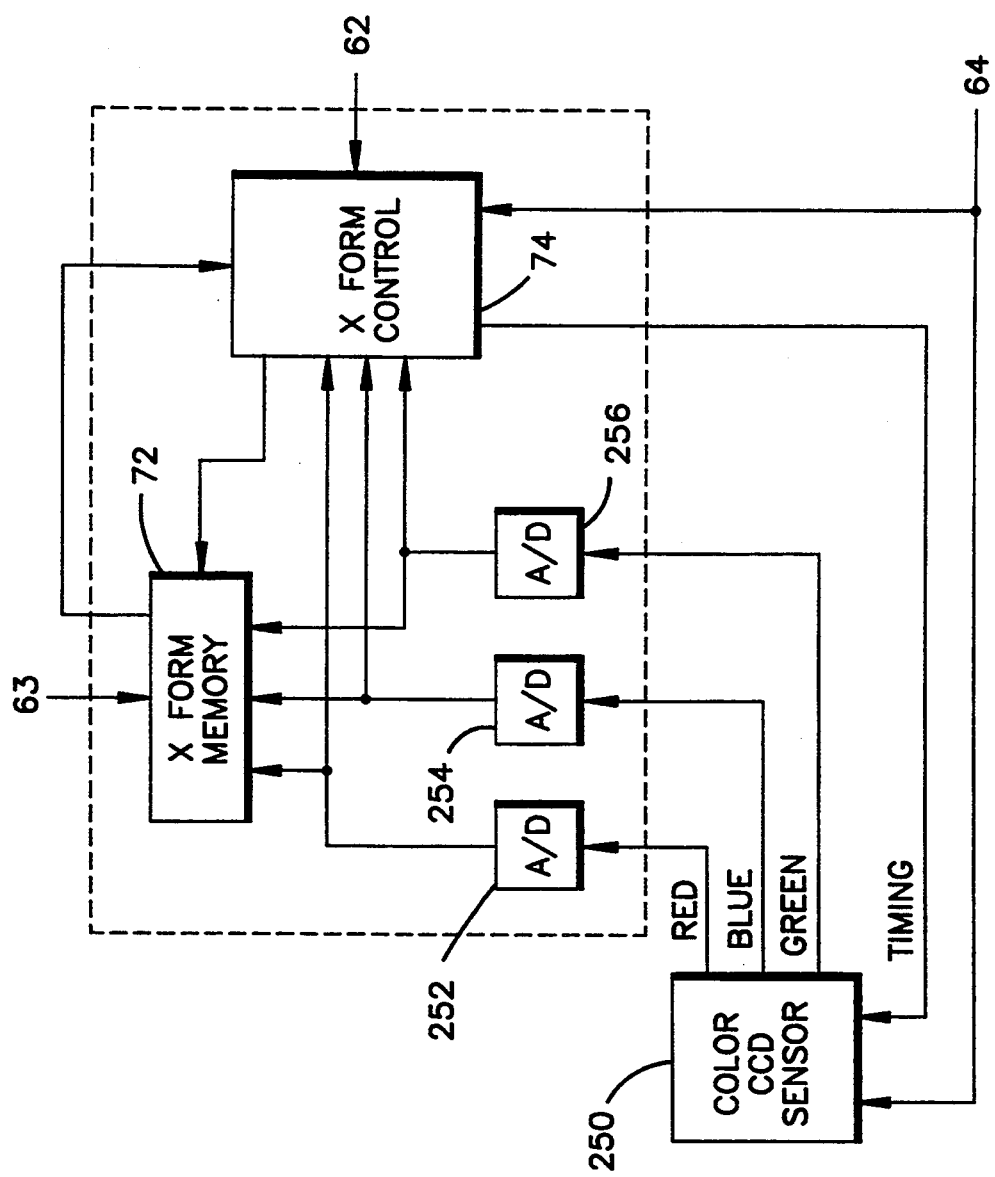
FIG. 28 shows a block diagram of an alternative embodiment of a portion of FIG. 4.

In another alternative embodiment, the recognition of multiple color printed data on the transaction document is accomplished by having a full spectrum white light source illuminating multiple colors. The reflected light is then sensed by a color CCD sensor, FIG. 28. This eliminates the need for switching the LED's as discussed above and provides even greater flexibility of document design. The color CCD provides three outputs for each pixel area, one for each of the colors, blue, green and red.

Transform memory 72 is similar to the transform memory utilized in the alternating red and green embodiment, except the transform memory includes three portions instead of two, one for each of the three colors, red, green, and blue. Each portion of the transform memory 72 is mapped in a similar manner as done for the other embodiments with plain reflective document. When the reflective document is read by the document reader, an average of the digitized intensity output signals with a sensitivity of 128, representative of each of the red, green and blue outputs from CCD sensor 250, is generated for each color along the columns of the reflective document. Predetermined percentages for each of the red, green and blue colors are applied, in a similar manner as done with respect the previously described embodiments, to each of the red, green, and blue averaged digitized intensity output signals to determine the threshold values for each of the blue, red and green colors. The corresponding portions of transform memory are then mapped with 1's at addresses above or equal to the threshold value for each of the red, green and blue outputs and 0's at addresses below the threshold value for each of the red, green and blue outputs.

When a multi-colored document is then read, the color CCD sensor 250 provides three output signals, red, green and blue, representative of the reflected light from each pixel of the multi-colored document. The output signals are applied to A/D converters 252, 254, and 256, under control of transform control 74 via timing signals from CCD array timing control 64. The A/D convertors provide digitized intensity output signals, 7 bits, to address the transform memory mapped as a function of the threshold values for the three different colors. The transform memory is also addressed by signals, ten bits, from transform control 64 representative of the column of each pixel area, and signals, two bits, from the transform control 64 representative of the three different colors.

A single bit signal for each of the three colors is addressed for each pixel area and stored in image memory 62. For example, if the digitized output signals for a pixel area are above the threshold value for the blue color but below the threshold values for the green and red colors, a "1" is selected for the blue output and "0"s for the green and red colors, and then stored in image memory. The single bit signals from the transform memory 72 are stored in separable image fields, one for each color, or three fields. Each of the color image fields are stored in the same memory array. These image fields are then interrogated in a similar manner as previously described herein with regard to the alternating light source embodiment.

The transaction document reader 20 can be utilized to facilitate transactions involving transaction document 90. Transaction document 90 includes marking areas 94 to record marks to complete a transaction. The transaction document 90 also includes a signature/address block 98. Usually, in a normal transaction the signature and address block 98 of the transaction document 90 is required to be completed. This information is typically necessary to associate a user with the transaction document. For example, the name is associated with a winning lottery ticket. So that completing such address and name information is not necessary with the completion of each transaction document 90, a method for performing a transaction without such signature may be accomplished with the use of reader 20. A facilitated transaction utilizing a lottery player shall be described in further detail below.

Figure 23A:
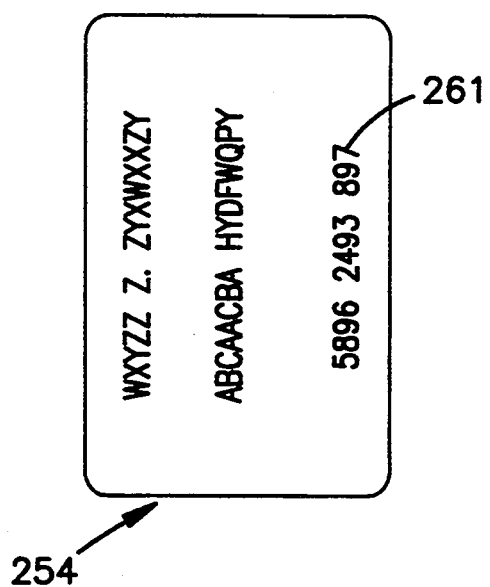
FIG. 23A, 23B, 23C, and 23D, are views of cards to be used in a transaction method utilizing the transaction document reader of FIG. 2.

The lottery player is provided with a user identification card 254, FIG. 23A. The identification card 254 includes the players identification number 261. The lottery player also has a player personalized document, such as a bank card with an account number thereon 258, FIG. 23C, or an address/signature card 260, FIG. 23D. The player personalized document could be any document which when associated with the player would identify the player.

A player, prior to making a first transaction, has identification card 254 optically read by document transaction reader 20. The personalized document, 258 or 260, also is digitally imaged by the transaction document reader 20. The identification number 261 on identification card 254 is stored with the associated digitally imaged player personalized document, 258 or 260. Therefore, in subsequent transactions, the player personalized document, 258 or 260, is readily accessed by merely optically reading the identification number 261 with which the personalized document is associated.

Thus, after such information is stored, transactions are completed by transporting a lottery document through the document reader, which reads the handwritten marks thereon and also transports the user identification card therethrough so that the identification number 261 is optically recognized. The identification number 261 is then associated with the personalized document information. As such, the player need not write his signature on the lottery document in a signature block like block 98, as the identification number 261 performs the function of associating the lottery document with the player via the stored personalized document information.

This association function is also used to associate a receipt, FIG. 6, and the receipt number 124, to a personalized bank account number from the bank account number card which was previously optically recognized and previously stored in conjunction with identification number 261. Thus, if a lottery player had a winning receipt, he need only have the identification number on his identification card read and associated with the reading of the receipt number in order to identify a bank account for proceeds to be deposited within.

Figure 23B:
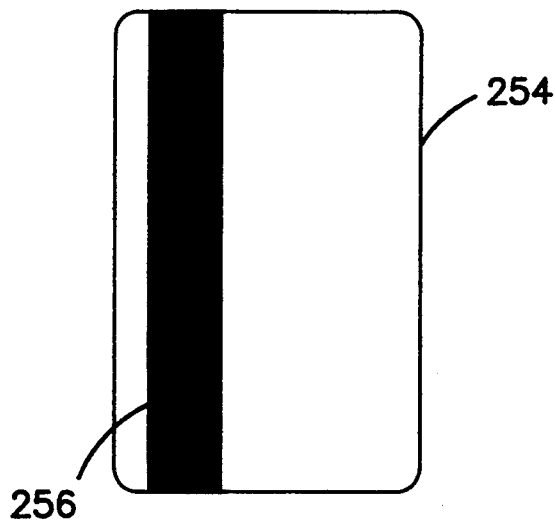
Figure 23C:
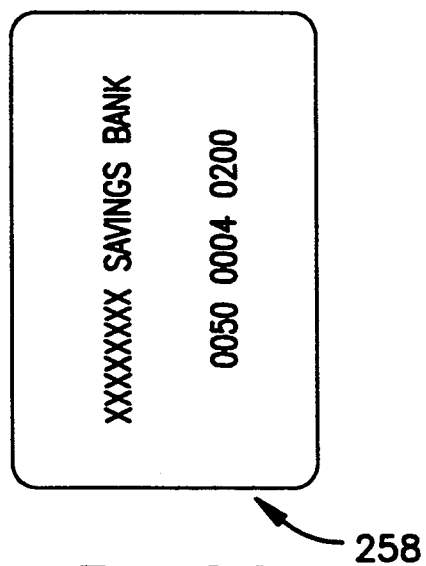
Figure 23D:
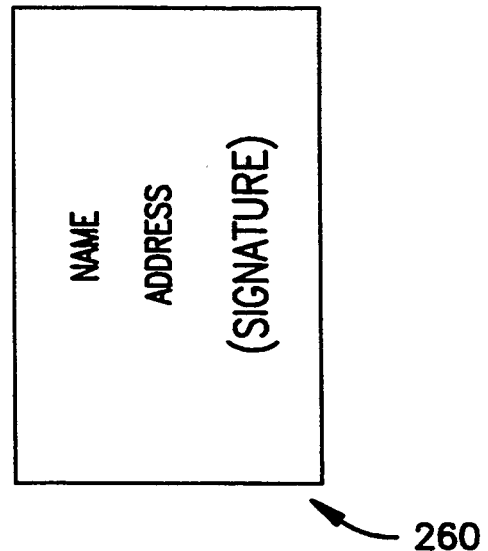

Further, reader 20 is provided with a card swipe 16 to read a magnetic strip 256 on the reverse side of identification card 254 with the ID card number 261 encoded thereon, FIG. 23B. Thus, either a magnetic reader or an optical reader could perform the reading function of the identification number and hasten the transaction.

Although the present invention has been described above in a preferred form, those skilled in the art will readily appreciate that various modifications can be made without departing from the spirit and scope of the invention as bounded by the claims of the application itself.

What is claimed is:

1. An apparatus for reading image data on a transaction document, said image data including a plurality of marking areas employed by a user to record marks, the apparatus comprising:

sensor means for sensing, one row at a time, a plurality of rows of image data as said document is transported across said sensor means, each row including a plurality of columns, said sensor means comprising means for generating output signals representative of said pixel areas;

transform means for receiving said output signals and generating bit signals representative of each pixel area, wherein said transform means comprises means for digitizing said output signals representative of said pixel areas and for providing gray scale digitized output signals, transform memory means for generating and storing bit signals for individual columns as a function of a threshold value, and means for addressing said transform memory means to select a bit signal representative of whether the gray scale digitized output signals are representative of generally dark or light pixel areas;

image memory means for storing said bit signals, said image memory means being organized into rows and columns of bit signals corresponding to said plurality of rows and columns of said pixel areas of said image data;

means for locating at least one portion of said image memory means representative of at least one of said plurality of marking areas of said transaction document, said means for locating being operative after rows of bit signals representative of said at least one marking area are stored in said image memory means and while additional rows of bit signals representative of other image data are being sensed, transformed, and stored in said image memory; and means for identifying marks made in said at least one marking area while said additional rows of bit signals are being stored and while other marking areas are being located by probing said bit signals within said image memory means.

2. An apparatus according to claim 1, wherein said means for addressing, comprises:

means for applying the gray scale digitized output signals representative of said pixel areas and bit position signals representative of the columns of said pixel areas to said transform memory means, on a pixel by pixel basis; and means for selecting from said transform memory, in response to said means for applying, a bit signal for each of said gray scale digitized output signals representative of said pixel areas.

3. An apparatus according to claim 2, wherein said transform memory means comprises:

means for averaging a plurality of output signals representative of pixel areas in each column of pixel areas when a reflective card is transported across said sensor means and for generating an averaged output signal representative of said output signals;

means for applying a predetermined threshold percentage to the averaged output signal to determine a threshold value address; and means for mapping said transform memory such that said transform memory contains a first bit signal at said threshold value address and at addresses higher than said threshold value address, and contains a second bit signal at addresses lower than said threshold value address.

4. An apparatus for reading image data on a transaction document, said image data including a plurality of marking areas employed by a user to record marks, the apparatus comprising:

sensor means for sensing, one row at a time, a plurality of rows of image data as said document is transported across said sensor means, each row including a plurality of columns, said sensor means comprising means for generating output signals representative of said pixel areas;

transform means for receiving said output signals and generating bit signals representative of each pixel area;

image memory means for storing said bit signals, said image memory means being organized into rows and columns of bit signals corresponding to said plurality of rows and columns of said pixel areas of said image data;

means for locating at least one portion of said image memory means representative of at least one of said plurality of marking areas of said transaction document, including means for identifying a type of transaction document by probing a predetermined plurality of rows of said image memory means in order to determine dimensions of said document, said type of document having certain dimensions; and wherein said at least one portion of image memory means representative of said at least one of said plurality of marking areas is located as a function of stored predetermined distances measured with respect to said dimensions of said type of transaction document identified, said means for locating being operative after rows of bit signals representative of said at least one marking area are stored in said image memory means and while additional rows of bit signals representative of other image data are being sensed, transformed, and stored in said image memory; and means for identifying marks made in said at least one marking area while said additional rows of bit signals are being stored and while other marking areas are being located by probing said bit signals within said image memory means.

5. An apparatus according to claim 4, wherein said identifying means comprises:

means for finding a leading edge of said transaction document by probing said columns of said image memory as said rows of bit signals are stored; and means for finding side edges of said transaction document by probing said rows of said image memory such that, once side edges are found, the width of said document is realized.

6. An apparatus according to claim 5, wherein one of said side edges is found by calibration of said image memory, said one of said side edges corresponding to a side edge of said transaction document being forced against an alignment rail as said document is transported across said sensor means.

7. An apparatus for reading image data on a transaction document, said image data including a plurality of marking areas employed by a user to record marks, the apparatus comprising:

sensor means for sensing, one row at a time, a plurality of rows of image data as said document is transported across said sensor means, each row including a plurality of columns, said sensor means comprising means for generating output signals representative of said pixel areas;

transform means for receiving said output signals and generating bit signals representative of each pixel area;

image memory means for storing said bit signals, said image memory means being organized into rows and columns of bit signals corresponding to said plurality of rows and columns of said pixel areas of said image data;

means for locating at least one portion of said image memory means representative of at least one of said plurality of marking areas of said transaction document, said means for locating comprising, means for identifying a type of transaction document by probing a predetermined plurality of rows of said image memory means to determine dimensions of said document, said type of document having predetermined dimensions;

means for probing at least one column of said image memory means to locate a first mark position, the image data of said document including a plurality of mark positions; and means for locating the at least one portion of image memory means representative of said at least one of said plurality of marking areas as a function of a predetermined distance from said first mark position to said at least one marking area dependent upon said type of transaction document identified, said means for locating being operative after rows of bit signals representative of said at least one marking area are stored in said image memory means and while additional rows of bit signals representative of other image data are being sensed, transformed, and stored in said image memory; and means for identifying marks made in said at least one marking area while said additional rows of bit signals are being stored and while other marking areas are being located by probing said bit signals within said image memory means.

8. An apparatus according to claim 7, further comprising means for controlling the speed at which said document is transported across said sensor means as a function of said plurality of mark positions of said document.

9. An apparatus for reading image data on a transaction document, said image data including a plurality of marking areas employed by a user to record marks, the apparatus comprising:

sensor means for sensing, one row at a time, a plurality of rows of image data as said document is transported across said sensor means, each row including a plurality of columns, said sensor means comprising means for generating output signals representative of said pixel areas;

transform means for receiving said output signals and generating bit signals representative of each pixel area;

image memory means for storing said bit signals, said image memory means being organized into rows and columns of bit signals corresponding to said plurality of rows and columns of said pixel areas of said image data;

means for locating at least one portion of said image memory means representative of at least one of said plurality of marking areas of said transaction document, said means for locating being operative after rows of bit signals representative of said at least one marking area are stored in said image memory means and while additional rows of bit signals representative of other image data are being sensed, transformed, and stored in said image memory; and means for identifying marks made in said at least one marking area while said additional rows of bit signals are being stored and while other marking areas are being located by probing said bit signals within said image memory means, said identifying means comprising, means for probing a plurality of lines of bit signals representative of pixel areas extending across said marking area within said at least one portion of said image memory means in order to identify whether said lines contain at least one bit signal representative of a dark pixel area;

means for comparing the number of lines containing said at least one bit signal to at least one predetermined number of lines; and means for filtering the result of said means for comparing in order to identify whether a mark appears in said at least one marking area.

10. An apparatus according to claim 9 wherein said means for filtering comprises means for carrying out the following process:

if said means for probing identifies a number of lines less than a first predetermined number of lines but more than a second predetermined number of lines, counting the number of bit signals representative of dark pixel areas in said portion of image memory means representative of said at least one marking area and concluding that there is a mark in said at least one marking area if said number of bit signals counted is greater than a predetermined number of bit signals, otherwise concluding that no mark is present in said marking area;

if said means for probing identifies a number of lines greater than said first predetermined number of lines, concluding that there is a mark in said at least one marking area; and if said means for probing identifies a number of lines less than said second predetermined number of lines, concluding that there is no mark in said marking area.

11. An apparatus according to claim 9 wherein said means for filtering comprises means for carrying out the following process:

if said means for probing identifies a number of lines less than a first predetermined number of lines but more than a second predetermined number of lines, applying a neural network means to said portion of said image memory means representative of said at least one marking area, said neural network means for determining if a mark is placed in said marking area;

if said means for probing identifies a number of lines greater than said first predetermined number of lines, concluding that there is a mark in said at least one marking area; and if said means for probing identifies a number of lines less than said second predetermined number of lines, concluding that there is no mark in said marking area.

12. An apparatus according to claim 9 wherein said means for filtering comprises:

means for counting said bit signals representative of dark pixel areas in said at least one marking area whenever said means for probing identifies all said plurality of lines as having at least one bit signal representative of a dark pixel area; and means for identifying that a mark previously placed in the marking area has been scratched out by comparing said number of bit signals to a certain percentage of overall bit signals representative of said at least one marking area.

13. An apparatus for reading image data on a transaction document, said image data including a plurality of marking areas employed by a user to record marks, the apparatus comprising:

sensor means for sensing, one row at a time, a plurality of rows of image data as said document is transported across said sensor means, each row including a plurality of columns, said sensor means comprising means for generating output signals representative of said pixel areas;

transform means for receiving said output signals and generating bit signals representative of each pixel area;

image memory means for storing said bit signals, said image memory means being organized into rows and columns of bit signals corresponding to said plurality of rows and columns of said pixel areas of said image data;

means for locating at least one portion of said image memory means representative of at least one of said plurality of marking areas of said transaction document, said means for locating being operative after rows of bit signals representative of said at least one marking area are stored in said image memory means and while additional rows of bit signals representative of other image data are being sensed, transformed, and stored in said image memory;

means for identifying marks made in said at least one marking area while said additional rows of bit signals are being stored and while other marking areas are being located by probing said bit signals within said image memory means; and means for compensating for distortion across a row of pixel areas when the row is sensed by said sensor means so that probing of rows of bit signals of said image memory representative of said at least one marking area is accurately performed when said marking area is located and marks therein are identified.

14. An apparatus for reading image data on a transaction document, said image data including a plurality of marking areas employed by a user to record marks, the apparatus comprising:

sensor means for sensing, one row at a time, a plurality of rows of image data as said document is transported across said sensor means, each row including a plurality of columns, said sensor means comprising means for generating output signals representative of said pixel areas;

transform means for receiving said output signals and generating bit signals representative of each pixel area;

image memory means for storing said bit signals, said image memory means being organized into rows and columns of bit signals corresponding to said plurality of rows and columns of said pixel areas of said image data;

means for locating at least one portion of said image memory means representative of at least one of said plurality of marking areas of said transaction document, said means for locating being operative after rows of bit signals representative of said at least one marking area are stored in said image memory means and while additional rows of bit signals representative of other image data are being sensed, transformed, and stored in said image memory;

means for identifying marks made in said at least one marking area while said additional rows of bit signals are being stored and while other marking areas are being located by probing said bit signals within said image memory means; and means for compensating for distortion across a column of pixel areas when a plurality of rows are sensed so that probing of columns of said bit signals of said image memory representative of said at least one marking area is accurately performed when said marking area is located and marks therein are identified.

15. An apparatus for reading image data on a transaction document, said image data including a plurality of marking areas employed by a user to record marks, the apparatus comprising:

sensor means for sensing, one row at a time, a plurality of rows of image data as said document is transported across said sensor means, each row including a plurality of columns, said sensor means comprising means for generating output signals representative of said pixel area;

transform means for receiving said output signals and generating bit signals representative of each pixel area;

image memory means for storing said bit signals, said image memory means being organized into rows and columns of bit signals corresponding to said plurality of rows and columns of said pixel areas of said image data;

means for locating at least one portion of said image memory means representative of at least one of said plurality of marking areas of said transaction document, said means for locating being operative after rows of bit signals representative of said at least one marking area are stored in said image memory means and while additional rows of bit signals representative of other image data are being sensed, transformed, and stored in said image memory;

means for identifying marks made in said at least one marking area while said additional rows of bit signals are being stored and while other marking areas are being located by probing said bit signals within said image memory means; and means for compensating for an improper angle of said document as it is transported across said sensor means so that probing of said rows and columns of said bit signals of said image memory representative of said at least one marking area is accurately performed when said marking area is located and marks therein are identified.

16. An apparatus for reading information on a transaction document having image data thereon, said image data including at least one marking area for a user to place a transaction mark, comprising:
  means for generating bit signals representative of rows and columns of dark or light pixel areas of said image data;
  an image memory for storing said bit signals, said image memory being organized in rows and columns corresponding to said pixel areas of said image data of said document;
  means for locating at least one portion of said image memory representative of said at least one marking area as a function of particular reference characteristics of said document, said locating means comprising,
    means for identifying a type of transaction document by probing a predetermined plurality of rows of said image memory to determine dimensions of said document, said type of document having predetermined dimensions, and
    means for locating the at least one portion of image memory representative of said at least one of said plurality of marking areas as a function of stored predetermined distances measured with respect to said dimensions of said type of transaction document identified; and
  means for identifying whether said at least one marking area contains a mark or lacks a mark by probing a plurality of lines of said bit signals of said image memory representative of pixel areas extending across said marking areas.

17. An apparatus for reading information on a transaction document having image data thereon, said image data including at least one marking area for a user to place a transaction mark, comprising:
  means for generating bit signals representative of rows and columns of dark or light pixel areas of said image data;
  an image memory for storing said bit signals, said image memory being organized in rows and columns corresponding to said pixel areas of said image data of said document;
  means for locating at least one portion of said image memory representative of said at least one marking area as a function of particular reference characteristics of said document by probing said bit signals of said image memory representative of a plurality of predetermined columns of said document and by locating at least one strobe mark, said marking area being a predetermined distance from said at least one strobe mark; and
  means for identifying whether said at least one marking area contains a mark or lacks a mark by probing a plurality of lines of said bit signals of said image memory representative of pixel areas extending across said marking areas.

18. An apparatus for reading information on a transaction document having image data thereon, said image data including at least one marking area for a user to place a transaction mark, comprising:
  means for generating bit signals representative of rows and columns of dark or. light pixel areas of said image data;
  an image memory for storing said bit signals, said image memory being organized in rows and columns corresponding to said pixel areas of said image data of said document;
  means for locating at least one portion of said image memory representative of said at least one marking area as a function of particular reference characteristics of said document; and
  means for identifying whether said at least one marking area contains a mark or lacks a mark by probing a plurality of lines of said bit signals of said image memory representative of pixel areas extending across said marking areas, said identifying means comprising,
    means for probing said plurality of lines of bit signals of said image memory representative of said pixel areas within said at least one marking area to identify whether said lines contain at least one bit signal representative of a dark pixel area;
    means for comparing the number of lines containing said at least one bit signal to at least one predetermined number of lines; and
    means for filtering the result of said means for comparing to identify whether a mark appears in said at least one marking area.

19. An apparatus according to claim 18 wherein said means for filtering comprises means for carrying out the following process:
  if said means for probing identifies a number of lines less than a first predetermined number of lines but more than a second predetermined number of lines, counting the number of bit signals representative of dark pixel areas in said portion of image memory representative of said at least one marking area and concluding that there is a mark in said at least one marking area if said number of bit signals counted is greater than a predetermined number of bit signals, otherwise concluding that no mark is present in said marking area;
  if said means for probing identifies a number of lines greater than said first predetermined number of lines, concluding that there is a mark in said at least one marking area; and
  if said means for probing identifies a number of lines less than said second predetermined number of lines, concluding that there is no mark in said marking area.

20. An apparatus according to claim 18 wherein said means for filtering comprises means for carrying out the following process:
  if said means for probing identifies a number of lines less than a first predetermined number of lines but more than a second predetermined number of lines, applying a neural network means to said portion of said image memory representative of said at least one marking area, said neural network comprising means for determining if a mark is placed in said marking area;
  if said means for probing identifies a number of lines greater than said first predetermined number of lines, concluding that there is a mark in said at least one marking area; and
  if said means for probing identifies a number of lines less than said second predetermined number of lines, concluding that there is no mark in said marking area.

21. An apparatus according to claim 18 wherein said means for filtering comprises:
  means for counting said bit signals representative of dark pixel areas in said at least one marking area whenever said means for probing identifies all said plurality of lines as having at least one bit signal representative of a dark pixel area; and means for identifying that a mark previously placed in the marking area has been scratched out by comparing said number of bit signals representative of dark pixel areas to a certain percentage of overall bit signals representative of said at least one marking area.

22. An apparatus for reading information on a transaction document having image data thereon, said image data including a plurality of marking areas employed by a user to record marks, said apparatus comprising:

sensor means for sensing at least a portion of said document;

means responsive to said sensor means for generating bit signals representative of pixel areas of said image data;

an image memory for storing said bit signals, said image memory being organized in rows and columns corresponding to said pixel areas of said image data on said transaction document;

means for identifying marks made on a preselected portion of said transaction document stored in image memory while bit signals are being generated for additional portions of said transaction document that are being sensed, whereby marks are identified by determining the status of a portion of said bit signals in said image memory representative of said preselected portion; and means for locating at least one portion of said image memory means representative of at least one of said plurality of marking areas of said transaction document, said means for locating comprising, means for identifying a type of transaction document by probing a predetermined plurality of rows of said image memory means in order to determine dimensions of said document; and means for locating said at least one portion of image memory means representative of said at least one of said plurality of marking areas as a function of stored predetermined distances measured with respect to said dimensions of said type of transaction document identified.

23. An apparatus for reading information on a transaction document having image data thereon, said apparatus comprising:

sensor means for sensing at least a portion of said document;

means responsive to said sensor means for generating bit signals representative of pixel areas of said image data;

an image memory for storing said bit signals, said image memory being organized in rows and columns corresponding to said pixel areas of said image data on said transaction document;

means for identifying marks made on a preselected portion of said transaction document stored in image memory while bit signals are being generated for additional portions of said transaction document that are being sensed, whereby marks are identified by determining the status of a portion of said bit signals in said image memory representative of said preselected portion; and means for compensating for distortion across a row of pixels when the row is sensed by said sensor means so that determining the status of said digital bits representative of said particular document portion is accurate.

24. An apparatus for reading information on a transaction document having image data thereon, said apparatus comprising:

sensor means for sensing at least a portion of said document;

means responsive to said sensor means for generating bit signals representative of pixel areas of said image data;.

an image memory for storing said bit signals, said image memory being organized in rows and columns corresponding to said pixel areas of said image data on said transaction document;

means for identifying marks made on a preselected portion of said transaction document stored in image memory while bit signals are being generated for additional portions of said transaction document that are being sensed, whereby marks are identified by determining the status of a portion of said bit signals in said image memory representative of said preselected portion; and means for compensating for distortion across a column of pixels when the column is sensed by said sensor means so that determining the status of said digital bits representative of said preselected portion of said document is accurate.

25. An apparatus for reading information on a transaction document having image data thereon, said apparatus comprising:

sensor means for sensing at least a portion of said document;

means responsive to said sensor means for generating bit signals representative of pixel areas of said image data;

an image memory for storing said bit signals, said image memory being organized in rows and columns corresponding to said pixel areas of said image data on said transaction document;

means for identifying marks made on a preselected portion of said transaction document stored in image memory while bit signals are being generated for additional portions of said transaction document that are being sensed, whereby marks are identified by determining the status of a portion of said bit signals in said image memory representative of said preselected portion; and means for compensation for an improper angle of said document as at least one of said document and said sensor means are moved relative to each other so that said determining the status of said digital bits that are representative of said particular document portion is accurately performed.

* * * * *